United States Patent
Firoozshahian et al.

(10) Patent No.: US 11,392,491 B2
(45) Date of Patent: Jul. 19, 2022

(54) HARDWARE-ASSISTED PAGING MECHANISMS

(71) Applicant: Intel Corporation, Santa Clara, CA (US)

(72) Inventors: Amin Firoozshahian, Mountain View, CA (US); Omid Azizi, Redwood City, CA (US); Chandan Egbert, San Jose, CA (US); David Hansen, Santa Clara, CA (US); Andreas Kleen, Portland, OR (US); Mahesh Maddury, Santa Clara, CA (US); Mahesh Madhav, Portland, OR (US); Alexandre Solomatnikov, San Carlos, CA (US); John Peter Stevenson, Chicago, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/020,444

(22) Filed: Jun. 27, 2018

(65) Prior Publication Data
US 2020/0004677 A1 Jan. 2, 2020

(51) Int. Cl.
G06F 12/02 (2006.01)
G06F 3/06 (2006.01)
G06F 12/1009 (2016.01)

(52) U.S. Cl.
CPC ........ *G06F 12/0261* (2013.01); *G06F 3/0608* (2013.01); *G06F 3/0641* (2013.01);
(Continued)

(58) Field of Classification Search
CPC ............. G06F 12/0261; G06F 12/0246; G06F 12/1009; G06F 3/0608; G06F 3/0641;
(Continued)

(56) References Cited

U.S. PATENT DOCUMENTS 9,454,321 B1 * 9/2016 Smaldone ............... G06F 3/061
9,483,484 B1 * 11/2016 Sridharan ........... G06F 16/1744
(Continued)

FOREIGN PATENT DOCUMENTS

CN 110647291 1/2020

OTHER PUBLICATIONS

Tian et al, "Last-level Cache Deduplication", ICS '14 Proceedings of the 28th ACM international conference on Supercomputing, pp. 53-62 [online] Retrieved from the Internet on Jun. 27, 2019 <URL:https://www.cs.virginia.edu/~smk9u/tian-ics-2014.pdf> (Year: 2014).*
(Continued)

*Primary Examiner* — David Yi
*Assistant Examiner* — Dustin B. Fulford
(74) *Attorney, Agent, or Firm* — Schwegman Lundberg & Woessner, P.A.

(57) ABSTRACT

Processing circuitry for computer memory management includes memory reduction circuitry to implement a memory reduction technique; and reference count information collection circuitry to: access a memory region, the memory region subject to the memory reduction technique; obtain an indication of memory reduction of the memory region; calculate metrics based on the indication of memory reduction of cache lines associated with the memory region; and provide the metrics to a system software component for use in memory management mechanisms.

22 Claims, 24 Drawing Sheets

(52) U.S. Cl.
CPC ........ *G06F 3/0679* (2013.01); *G06F 12/0246* (2013.01); *G06F 12/1009* (2013.01); *G06F 2212/401* (2013.01); *G06F 2212/7201* (2013.01); *G06F 2212/7205* (2013.01)

(58) Field of Classification Search
CPC ............. G06F 3/0679; G06F 2212/401; G06F 2212/7201; G06F 2212/7205
See application file for complete search history.

(56) References Cited

U.S. PATENT DOCUMENTS

| | | | |
|---|---|---|---|
| 9,836,243 B1* | 12/2017 | Chanler | G11C 16/3495 |
| 2005/0071571 A1 | 3/2005 | Luick | |
| 2014/0337577 A1* | 11/2014 | Burton | G06F 3/0689 |
| | | | 711/114 |
| 2017/0286003 A1* | 10/2017 | Sala | G06F 12/0802 |
| 2018/0004668 A1 | 1/2018 | Azizi et al. | |
| 2018/0329645 A1* | 11/2018 | Guerra Delgado | G06F 3/0608 |
| 2019/0087327 A1* | 3/2019 | Kanno | G06F 12/0261 |

OTHER PUBLICATIONS

"European Application Serial No. 19175771.5, Extended European Search Report dated Nov. 7, 2019", 8 pgs.

\* cited by examiner

```
FUNCTION REQUEST_REF_INFO (START_ADDR, SIZE, TH, TAG)
{
RC_ONE = 0; //INIT # OF CACHE LINES WITH REF COUNT OF 1
RC_TH = 0;  //INIT # OF CACHE LINES WITH RC <= TH
MAX_RC = 0; //INIT THE HIGHEST RC COUNT FOUND
RC_SUM = 0; //INIT TOTAL NUM OF REF COUNT
RC_AVG = 0; //INIT AVERAGE REF COUNT
NUM_LINES = 0; //INIT NUMBER OF LINES PROCESSED
END_ADDR = START_ADDR + SIZE;

//STEP THROUGH CACHE LINES
FOR EACH CACHE_LINE FROM START_ADDR TO END_ADDR {
      //GET THE REFERENCE COUNT OF THE CURRENT CACHE LINE
      REF_COUNT = CACHE_LINE.REF;

//INCREMENT APPROPRIATE VARIABLES
      IF REF_COUNT == 1
          RC_ONE++;

IF REF_COUNT < TH
          RC_TH++;

IF REF_COUNT > MAX_RC
          MAX_RC = REF_COUNT;

RC_SUM += REF_COUNT;

NUM_LINES++;
}

//COMPUTE AVERAGE
RC_AVG = RC_SUM/NUM_LINES;

RETURN RC_ONE, RC_TH, MAX_RC, RC_SUM, RC_AVG;

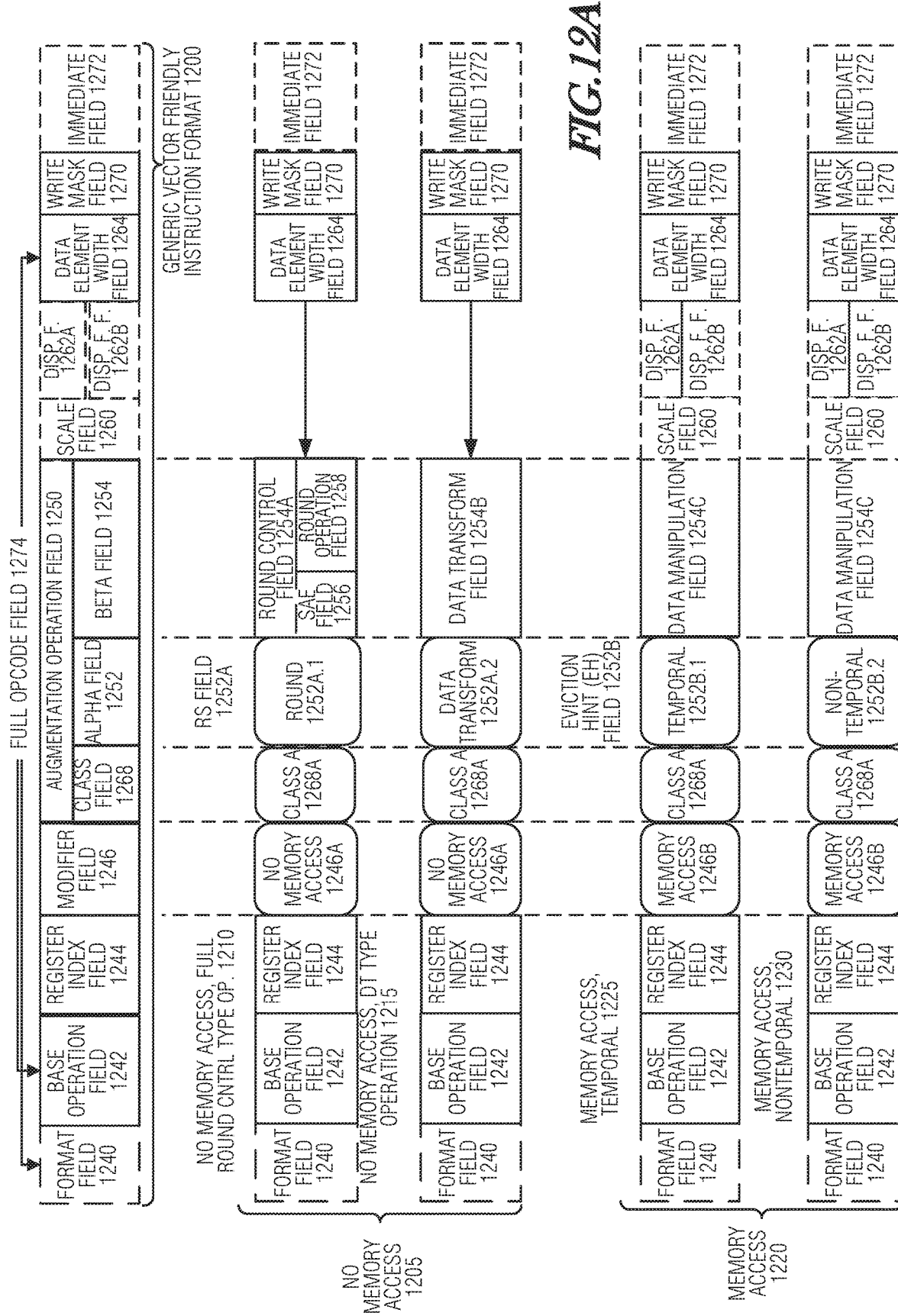

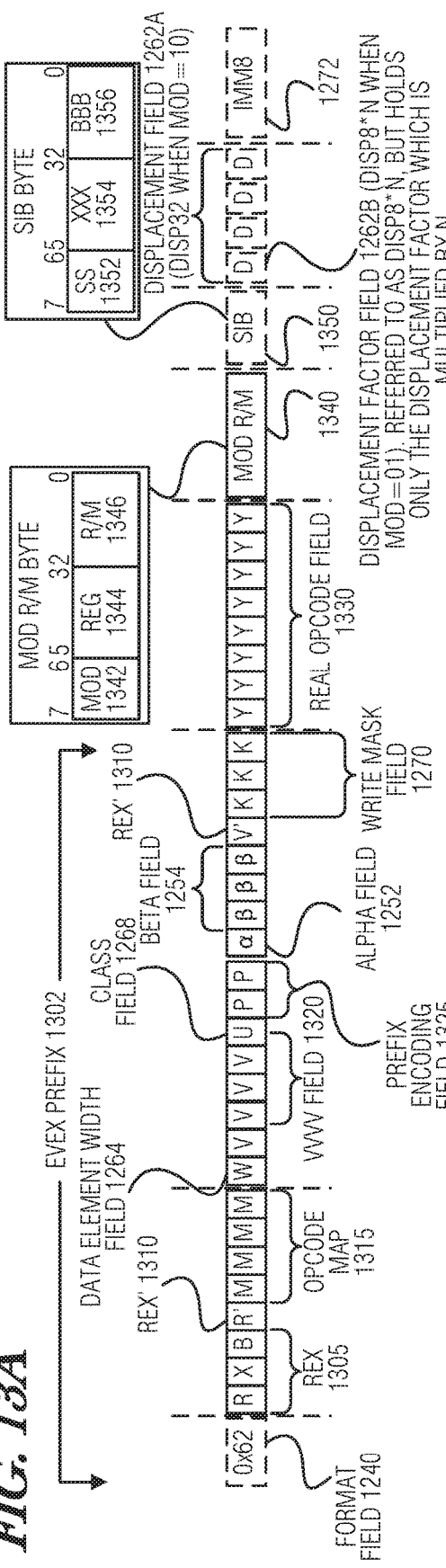
FIG. 13A
FIG. 13B
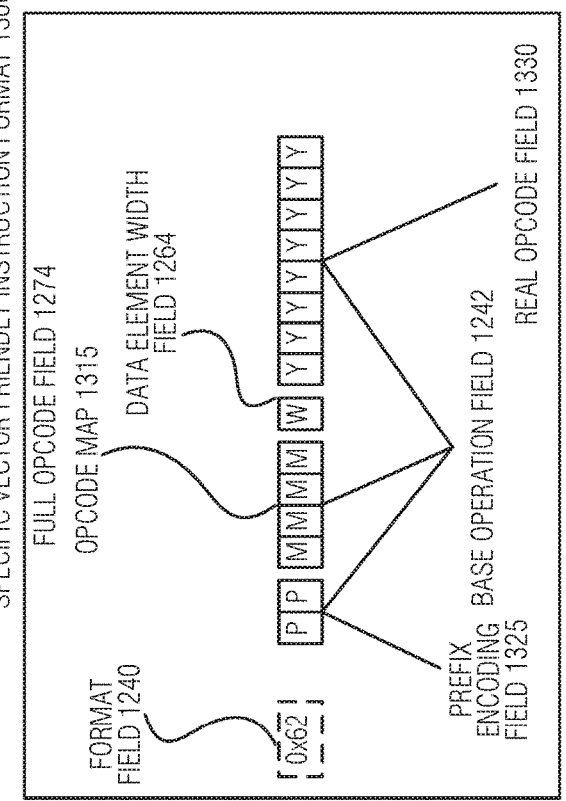
FIG. 13C

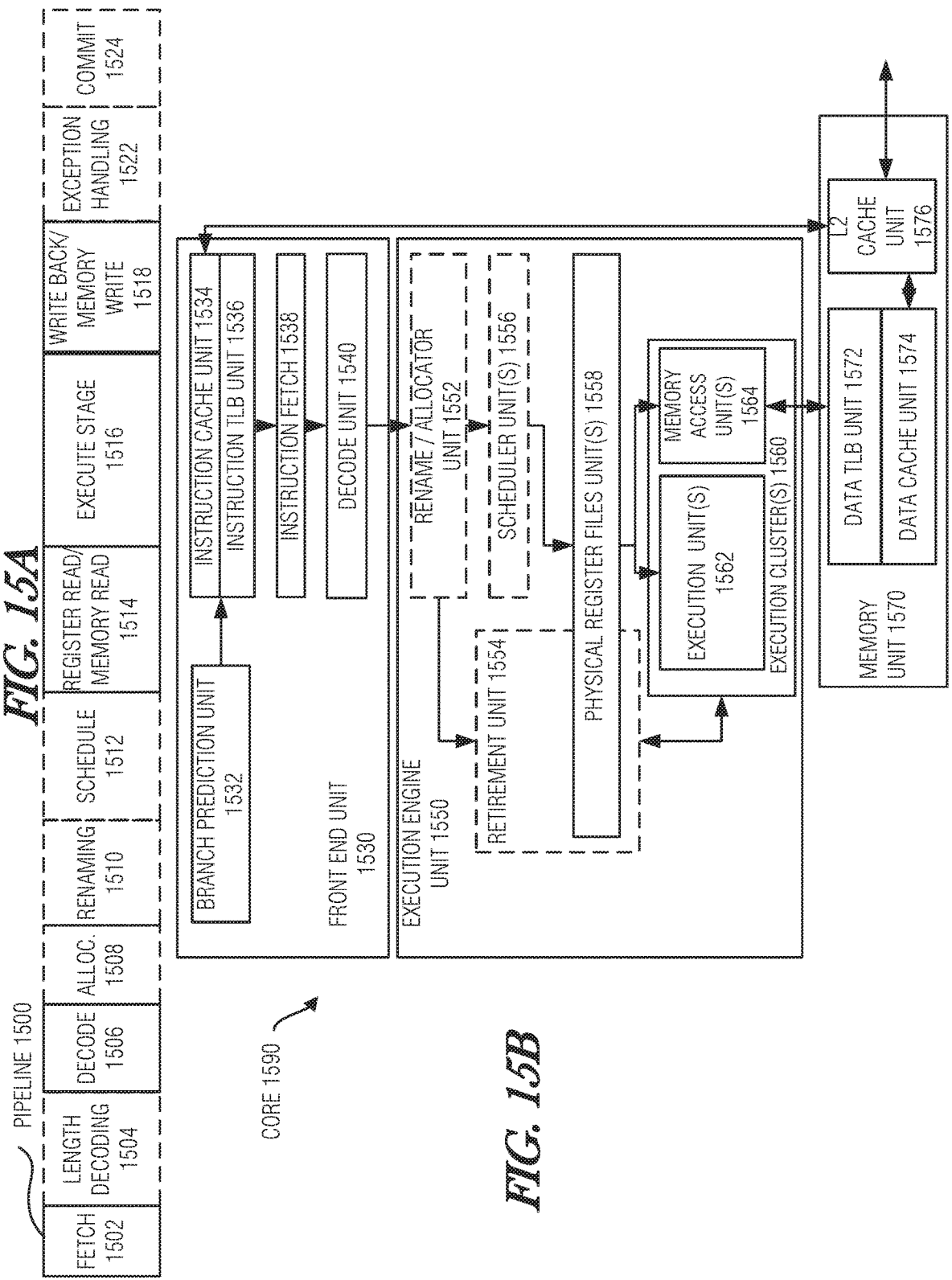

… # HARDWARE-ASSISTED PAGING MECHANISMS

TECHNICAL FIELD

Embodiments described herein generally relate to computer memory management, and in particular to systems and methods for hardware-assisted paging mechanisms.

BACKGROUND

Modern computing systems use an ever increasing amount of memory for operating systems, applications, and data. For efficient use of memory, various memory reduction techniques have been developed. Some memory reduction techniques aim to reduce the amount of memory used by using data compression techniques on the memory contents. Other memory reduction techniques eliminate duplicate copies of data in memory and use references to point to a single copy of the data, such as with memory deduplication techniques. In either case, more addressable memory space is advertised than the actual physical memory available.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 is a pseudocode listing illustrating a process to gather reference count information, according to an embodiment:

FIGS. 12A-12B are block diagrams illustrating a generic vector friendly instruction format and instruction templates thereof according to an embodiment;

FIGS. 13A-13D are block diagrams illustrating a specific vector friendly instruction format according to an embodiment;

FIG. 15A is a block diagram illustrating both an in-order pipeline and a register renaming, out-of-order issue/execution pipeline according to an embodiment;

FIG. 15B is a block diagram illustrating both an in-order architecture core and a register renaming, out-of-order issue/execution architecture core to be included in a processor according to an embodiment;

DETAILED DESCRIPTION

Figure 1:
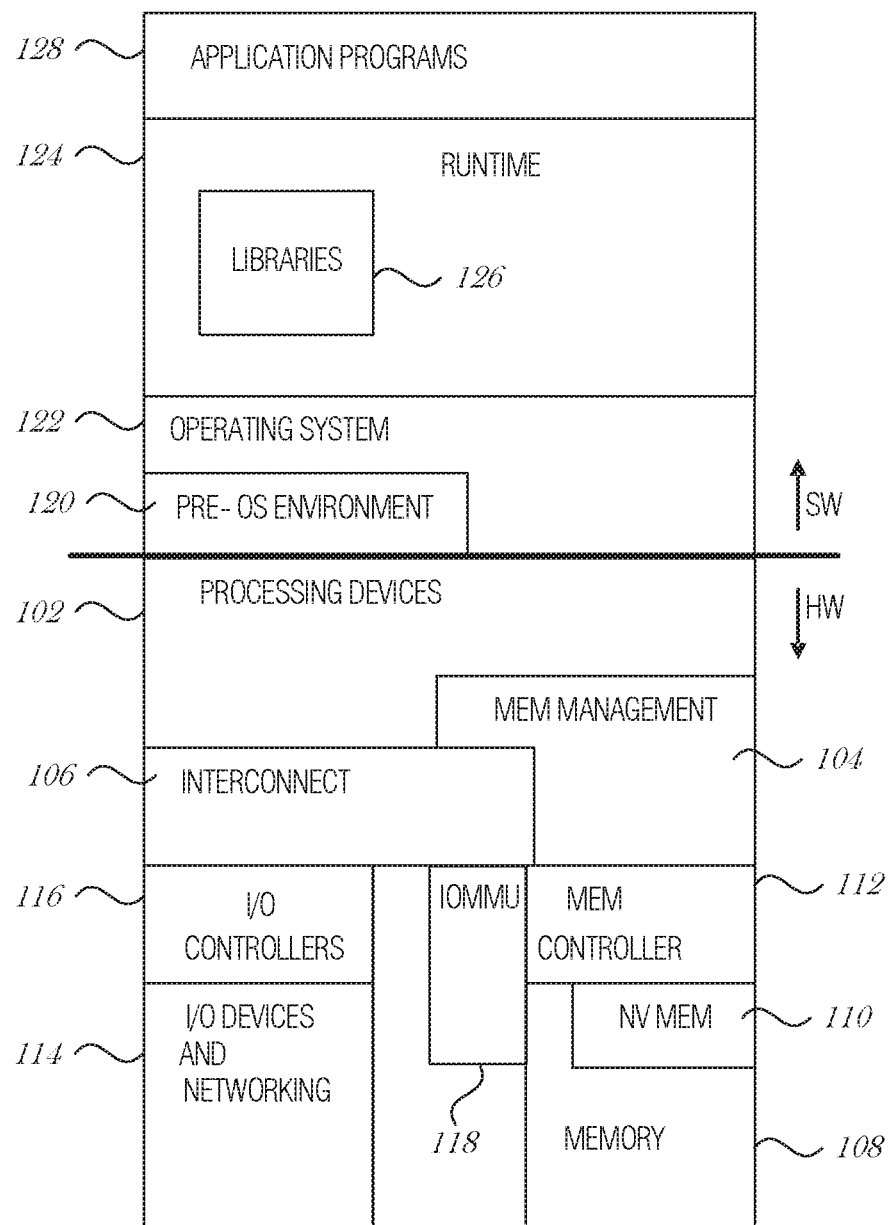
FIG. 1 is a diagram illustrating hardware and software architecture 100 of a computing system, in which various interfaces between hardware components and software components are shown, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Use of memory reduction techniques allow a memory consumer (e.g., an application, an operating system, a process, etc.) to address more memory than is actually available at the physical level. In other words, memory address space is decoupled from memory data space. For instance, an 8 gigabyte (GB) memory device may be advertised as having 12 GB of storage space available. When applications allocate memory in the memory device, some of the applications' data is compressed or remapped so that from the applications' point-of-view, there is 12 GB of addressable space (e.g., address space) that indirect into 8 GB of physical memory space (e.g., data space).

In an example, a system may use a memory reduction technique referred to as deduplication. Memory deduplication is a process for efficient memory use. Instead of storing multiple copies of the same data, one deduplicated copy is stored and additional data structures are used to track which other addresses may use the same "deduplicated" data. Memory deduplication is performed in hardware and may be provided by the memory controller. By deduplicating data, a memory controller may advertise more address space than there is data space.

Another example of memory reduction is a system that uses compression technology to compress contents of the physical memory and hence use memory more efficiently. In such a system when the central processing unit (CPU) writes a block of memory, for example a 4 kilobyte (KB) page, actual physical memory consumption may be much less than 4 KB if the contents of the page are compressed, hence allowing the physical memory to accommodate more contents than the original size of the block that was written.

The difference between the address space (e.g., addressable space) and the data space is determined by the amount of compression (e.g., compression ratio) the data undergoes. Based on various implementations, the compression ratio may be as high as 2:1, 2.5:1, or even higher, of address space to data space.

In such systems, the actual physical memory consumption may vary over time as data contents may have different compression ratios over the course of program execution. Decoupling of the address space from data space prevents system software from being aware of how much physical memory is actually consumed in the system. As a result, this indirection prevents system software from taking necessary actions in cases where physical memory is approaching its limit. Traditionally when the system software manages all physical memory, it is aware of the memory consumption and may start freeing space by swapping out to other forms of storage.

"Memory pressure" or "memory oversubscription" is a condition where physical memory consumption of the data space is approaching its limits (e.g., getting full) while the advertised address space still has unused regions. In such a situation, the system software may continue to attempt to allocate available address space, its metrics erroneously indicating that there is underlying memory available, when in reality, the data space is at or near capacity. Attempts to write to a completely full data space may result in data loss, memory errors, crashes, or other error states.

In an overcommitted memory system (e.g., a memory system using compression or deduplication with a high memory usage), the amount of memory available for use by software varies with the content that is written into memory. In such a system, software may cause the system to run out of usable memory simply by overwriting the contents of already allocated memory pages with less compressible content. The operating system (OS) is expected to deal with this memory pressure by swapping out memory to disk when memory pressure conditions arise.

In a memory compression scheme, the data stored in memory is first compressed using some compression algorithm, and then decompressed on the fly when the memory location is later accessed. By storing the data in a compressed form, the amount of usable memory is increased. Deduplication, in comparison, uses a scheme where identical chunks of data are reduced to fewer chunks, or deduplicated, so that fewer copies of the identical chunks are stored. Pointers and other mechanisms are used to mask the deduplication scheme from the owner process or thread.

When a fully compressed or deduplicated page is swapped out, due to the variance of compression page-to-page, some amount of physical memory is returned to the system. However, when swapping out a fully deduplicated page that shares all of its contents with other pages, there is no physical memory returned to the system.

Traditionally, operating systems sort and organize candidate pages for swapping based on their access history. Typically, the least recently accessed pages are placed at the top of this list as they are less likely to be accessed again. However, in a deduplicated memory system, depending on how many of the cache lines in those pages are shared with other pages in the system, swapping out those pages may not free up enough memory. What is needed is a mechanism to better manage paging in a deduplicated or compressed memory system. Implementation of such a mechanism increases the operational efficiency and ability of the compute system through better memory management. The implementations discussed herein improve the operation of a compute device at a fundamental level of memory management.

This disclosure describes an innovative approach to improve the efficiency of the paging mechanism of a computing system that uses memory deduplication by using a page-based reference count tracking scheme. The page-based reference count tracking scheme may be implemented in hardware and accessible from a software stack, such as through drivers, OS libraries, or the like. The page-based reference count tracking scheme described herein provides a way for an operating system process to collect reference count information of a given page from hardware. The page reference count information describes the degree of sharing for each candidate page in a deduplicated memory system. This information may assist system software when choosing the pages for swapping to maximize the released memory.

FIG. 1 is a diagram illustrating hardware and software architecture 100 of a computing system, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices, e.g., PCI. USB, etc. Memory 108 (e.g., dynamic random access memory—DRAM) and non-volatile memory 110 such as flash memory (e.g., electrically-erasable read-only memory—EEPROM, NAND Flash, NOR Flash, etc.) are interfaced with memory management device 104 and interconnect 106 via memory controller 112. This architecture microarchitecture 100 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by mediating access to memory 108 from I/O device 114. IOMMU 118 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basic operability of the computing device itself.

Figure 2:
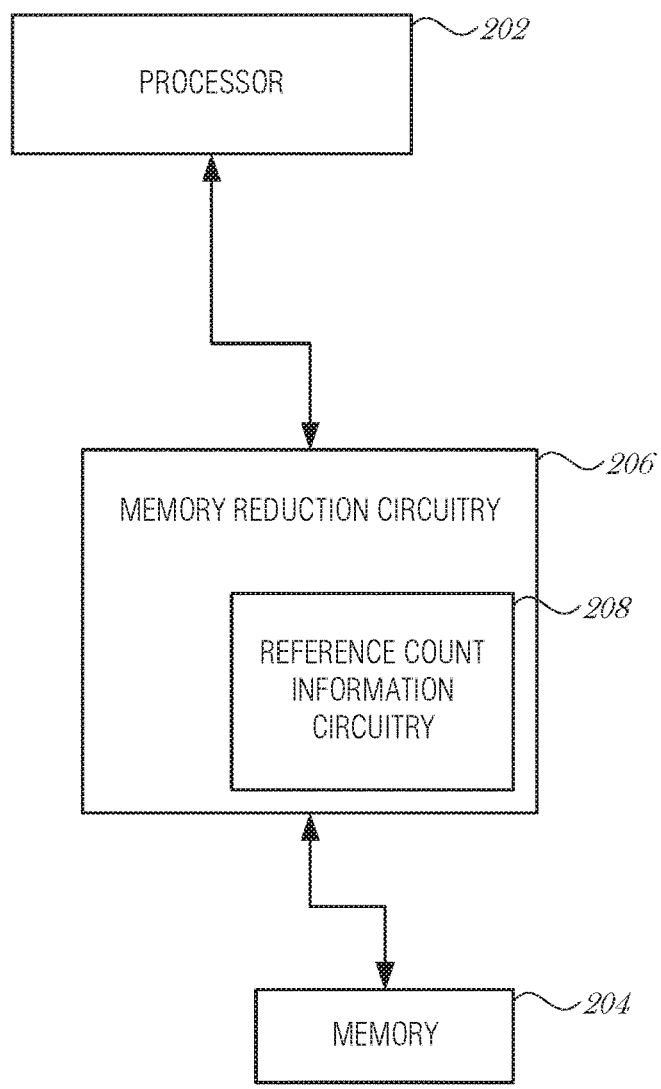
FIG. 2 is a block diagram illustrating a system, according to an embodiment.

FIG. 2 is a block diagram illustrating a system 200, according to an embodiment. The system 200 includes a processor 202 and a memory device 204. While only one processor 202 is illustrated in FIG. 2, it is understood that one or more processors 202 may be included in the system 200.

Figure 11:
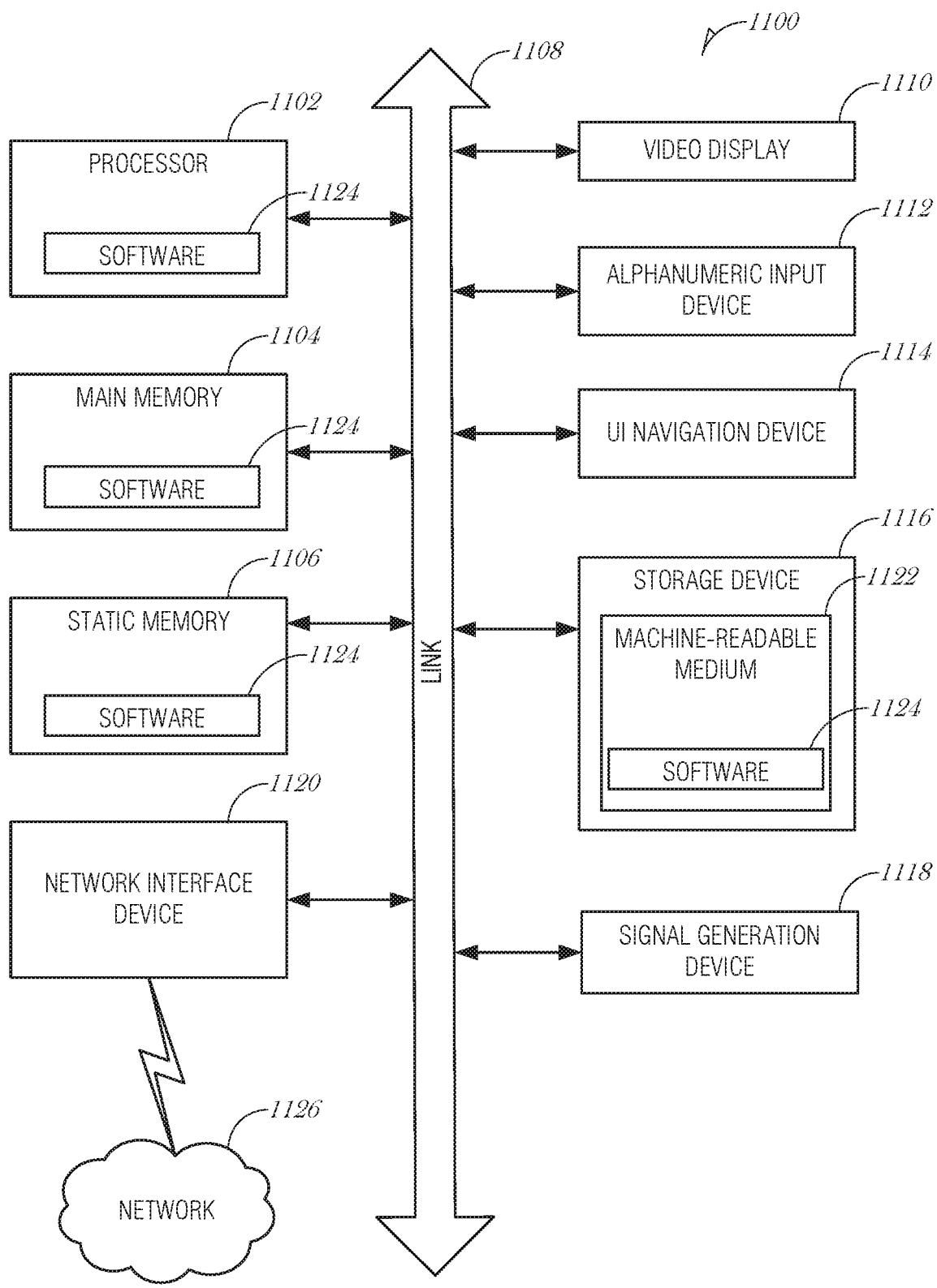
FIG. 11 is a block diagram illustrating an example machine upon which any one or more of the techniques (e.g., methodologies) discussed herein may perform, according to an embodiment.
Figure 18:
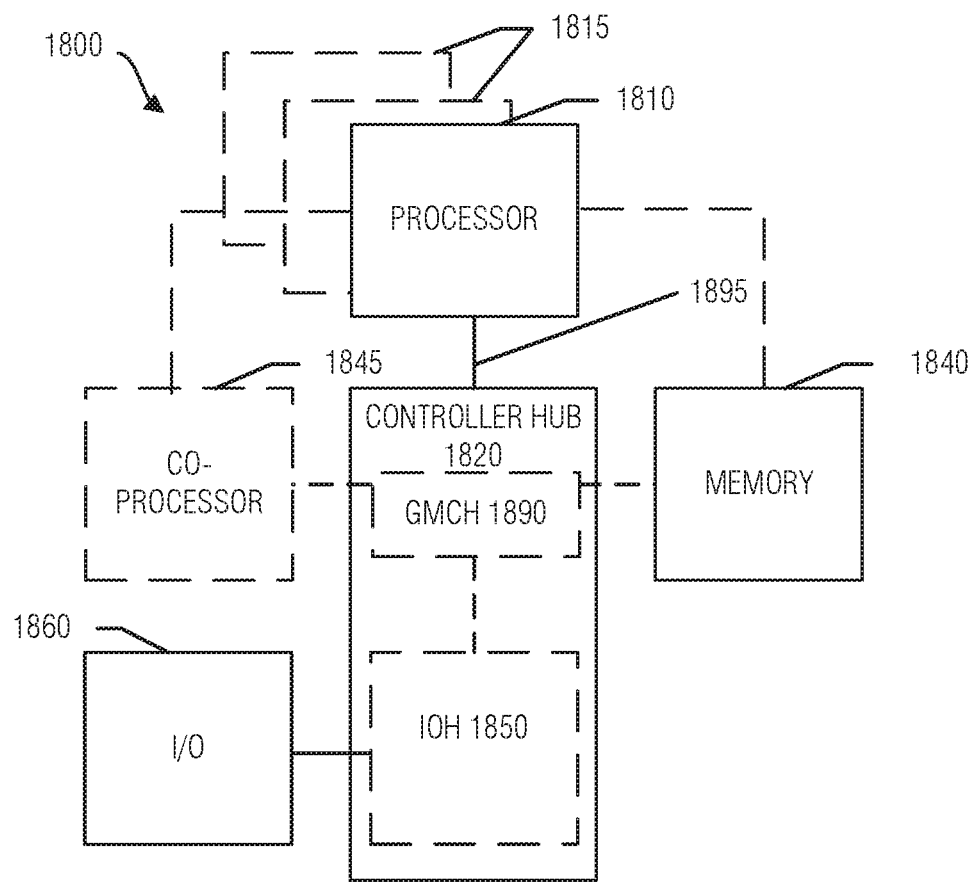
FIGS. 18-21 are block diagrams of computer architectures, according to an embodiment.

The processor 202 may be an instance of processing devices 102 of FIG. 1, processor 1102 of FIG. 11, or processor 1810 of FIG. 18, for example. The memory device 204 is coupled directly to the processor 202. The memory device 204 may be, for example, dynamic random access memory (DRAM), phase change memory (PCM), or a combination of the two. The memory device 204 may be an instance of main memory 1104 of FIG. 11, or memory 1840 of FIG. 18, for example.

Memory reduction circuitry 206 is used to compress or deduplicate data in the memory device 204. The memory reduction circuitry 206 may be incorporated into the processor 202 or may be separate special-purpose circuitry for memory reduction techniques. Memory reduction circuitry 206 may be an instance of memory management device 104 of FIG. 1, for example.

The system 200 also includes a memory page control circuitry 210, which may be integrated into a memory controller in the processor 202, or may be a separate unit. For instance, the memory page control circuitry 210 may be a coprocessor or other special-purpose processor (e.g., memory management device 104 of FIG. 1, graphics memory controller hub 1890 of FIG. 18, or integrated memory controller 1972 of FIG. 19).

The reference count information collection circuitry 208 is used to monitor pages in memory device 204. The operating system (OS) may communicate with the reference count information collection circuitry 208 to obtain assistance in determining which page to relinquish to relieve memory pressure. The reference count information collection circuitry 208 may be integrated into the memory reduction circuitry 206. When data is written to memory device 204, the data may be analyzed by the memory reduction circuitry 206 to determine whether the data is duplicative to that already stored in the memory device 204. If so, then the memory reduction circuitry 206 may create an entry in a table so that the address of the newly written data is indirected to the existing data address. The memory reduction circuitry 206 may then update the reference count for the cache line that holds the data to indicate that more than one address holds a reference to the data.

Compared to traditional systems where system software is used to manage the physical memory, in a deduplicated memory system or a system that uses memory compression, the actual physical memory consumption is only known to the hardware. The architecture described here implements an improved page swapping mechanism by tracking when cache lines in memory pages are shared outside of the boundary of the page (e.g., with another memory page). This sharing prevents the hardware from releasing those lines when the pages are swapped and as a result, the amount of memory released by swapping out a page may be less than the page size.

The reference count information collection circuitry 208 is used to provide the OS an indication of how many unique cache lines exist within a given page. This allows the OS to know how much memory will be freed up if the page were to be swapped out.

In a deduplicated memory system, cache lines that contain the same data are removed when only a single copy of the cache line with a given data exists in the memory. To track how many system addresses have a given data at any point in time in the system, the reference count information collection circuitry 208 is able to obtain a reference count associated with each cache line. By accounting for duplicates, the OS is able to use the available memory space more efficiently resulting in costs savings or increasing performance.

Figure 3:
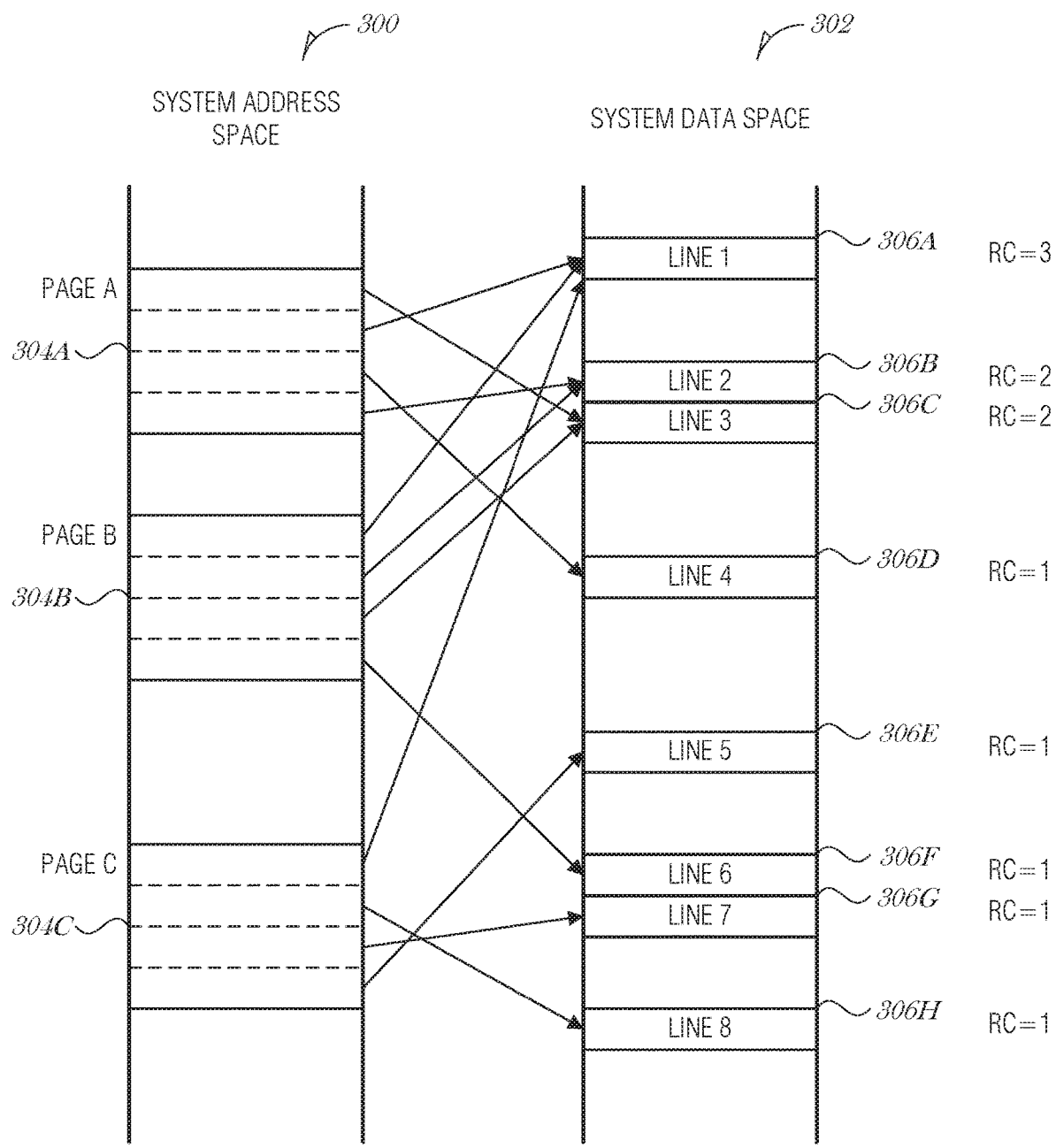
FIG. 3 is a diagram illustrating a mapping between system address space and system data space, according to an embodiment.

FIG. 3 is a diagram illustrating a mapping between system address space 300 and system data space 302, according to an embodiment. In a deduplicated memory system, the address space 300 is decoupled from the data space 302. Two distinct addresses in the address space 300 may reference (or indirect) to the same data in the data space 302. This arrangement provides an effective increase in the amount of data that may be stored in a memory device, depending on how much duplicative data exists in a system.

A page includes cache lines, which are the granularity of deduplication in this embodiment. In some conventional systems, page size is 4 KB (kilobytes) and cache line size is 64 bytes. This results in a page being able to store 64 cache lines. When the page's address space is decoupled from its data space, a 4 KB page has 64 addressable cache lines in the address space, but the cache lines that store actual data in the data space may be reused across several addresses over several different pages.

Sharing of cache lines across various memory addresses introduces challenges for the system software's paging mechanism. When system software decides to swap pages to secondary storage in order to free up memory, it cannot know how much memory will be released due to the fact that cache lines in a given page might be shared with other pages in the system. In the worst case, if all the cache lines in the page that the system software is attempting to swap are shared with other pages, swapping that page will not release any memory at all. This is because the deduplicated memory system will not release a given cache line in the data space until its reference count reaches zero (indicating that no addresses in the system address space is using that particular data). If there are more addresses in the system that are still using the particular data line in the data space, the hardware will keep it alive and will not attempt to release it.

In FIG. 3, the address space 300 includes three pages: Page A 304A, Page B 304B, and Page C 304C. For the purposes of simplicity, only three pages are illustrated and each page only includes addresses of four cache lines. It is understood that the address space 300 may include many more pages and each page may store more cache line addresses. The data space 302 includes eight cache lines 306A-H.

If system software attempts to swap Page A 304A, it will result in only one cache line being freed (line 306D), because the remainder of the cache lines being used by Page A 304A are also being used by other pages in the address space 300 (e.g., Page B 306A and Page C 306C). Based on the arrangement of the memory address and data space illustrated in FIG. 3, the best page to release would be Page C 304C, which would free three cache lines from data space 302.

To assist in this type of determination, the reference count information collection circuitry 208 is configured to access memory and read the reference count information of all the lines within the page. The reference count information collection circuitry 208 may be accessed by system software through the use of an application programming interface (API). The API may expose functionality of the reference count information collection circuitry 208 with a parameterized function call. An example function call is: Request_RC_Info( ). This function may be available to device driver software, libraries, or other low-level system software to access memory statistics during paging operations.

The operating system software may use Request_RC_Info( ) to obtain information about a page or a group of pages. The information gained may be used to sort pages so that pages that may release the most amount of memory are prioritized over those pages that may not release as much memory when swapped out.

An example prototype function call of Request_RC_Info( ) is Request_RC_Info(start_addr, size, th, tag), where start_addr is the memory address where to start collecting information, size is the size of the region that information should be collected for, th is the reference count threshold, and tag is an optional tag that may be used by system software to communicate status information, request priority, memory state, or other information. The size parameter may typically be the size of a memory page (e.g., 4 KB), but depending on the system confirmation or implementation, smaller or larger sizes may be used. The th parameter is used by the reference count information collection circuitry 208 to determine which cache lines to count within the given region. For example, if th=2, then the reference count information collection circuitry 208 will count the number of cache lines that have a reference count value of 2 or less.

It is understood that the parameters illustrated in this example function call may be changed depending on the actual implementation.

In response to the Request_RC_Info( ) call, the reference count information collection circuitry 208 scans the specified region of address space and provides details regarding reference counts and other information. Example return information includes RC(1), RC(threshold), RC(max), RC(sum), RC(average), and tag. The return information RC(1) is the number of cache lines with a reference count value of 1. The return information RC(threshold) is the number of cache lines with a reference count value less than or equal to the specified threshold (e.g., th parameter in Request_RC_Info( )). The return information RC(max) is the maximum reference count found in the specified memory region. The return information RC(sum) is the sum of all reference count values of all cache lines in the specified memory region. The return information RC(average) is the average reference count value of the reference counts over the cache lines in the specified memory region. The tag return value may be used for communication status information, memory state information, or the like. It is understood that other metrics, aggregations, statistics, or information regarding the specified memory region may be returned to the requesting system software process. This information may be returned as one more messages to the requester. Alternatively, the information may be communicated using registers. Parameters used to invoke the Request_RC_Info( ) call may also be passed via registers.

Returned reference count information is used by system software to judge whether a given page is a good candidate for swapping or not. Ideally system software is able to combine reference count information collected this way with the page access history that it keeps internally to re-arrange the list of candidate pages for swapping. This allows the system to swap pages that are not needed by the applications anymore and also release the maximum amount of memory.

FIG. 4 is a pseudocode listing illustrating a process 400 to gather reference count information, according to an embodiment. The process 400 may be performed by the reference count information collection circuitry 208 of FIG. 2, for example. The function Request_RC_Info( ) is called with the parameters: start_addr, size, th, tag. The function Request_RC_Info( ) uses these parameters and sets variables RC_ONE, RC_TH, MAX_RC, RC_SUM, and RC_AVG. These variables correspond to the functional outputs discussed above. RC(1), RC(threshold), RC(max), RC(sum), and RC(average). The operating system software may use one or more of these metrics to arrange a list of pages for memory management. It is understood that the function may not calculate or set all of the outputs. Further, the function may be designed differently, for example, to use the tag parameter, or another parameter not shown, to control which of the outputs to calculate.

Figure 5:
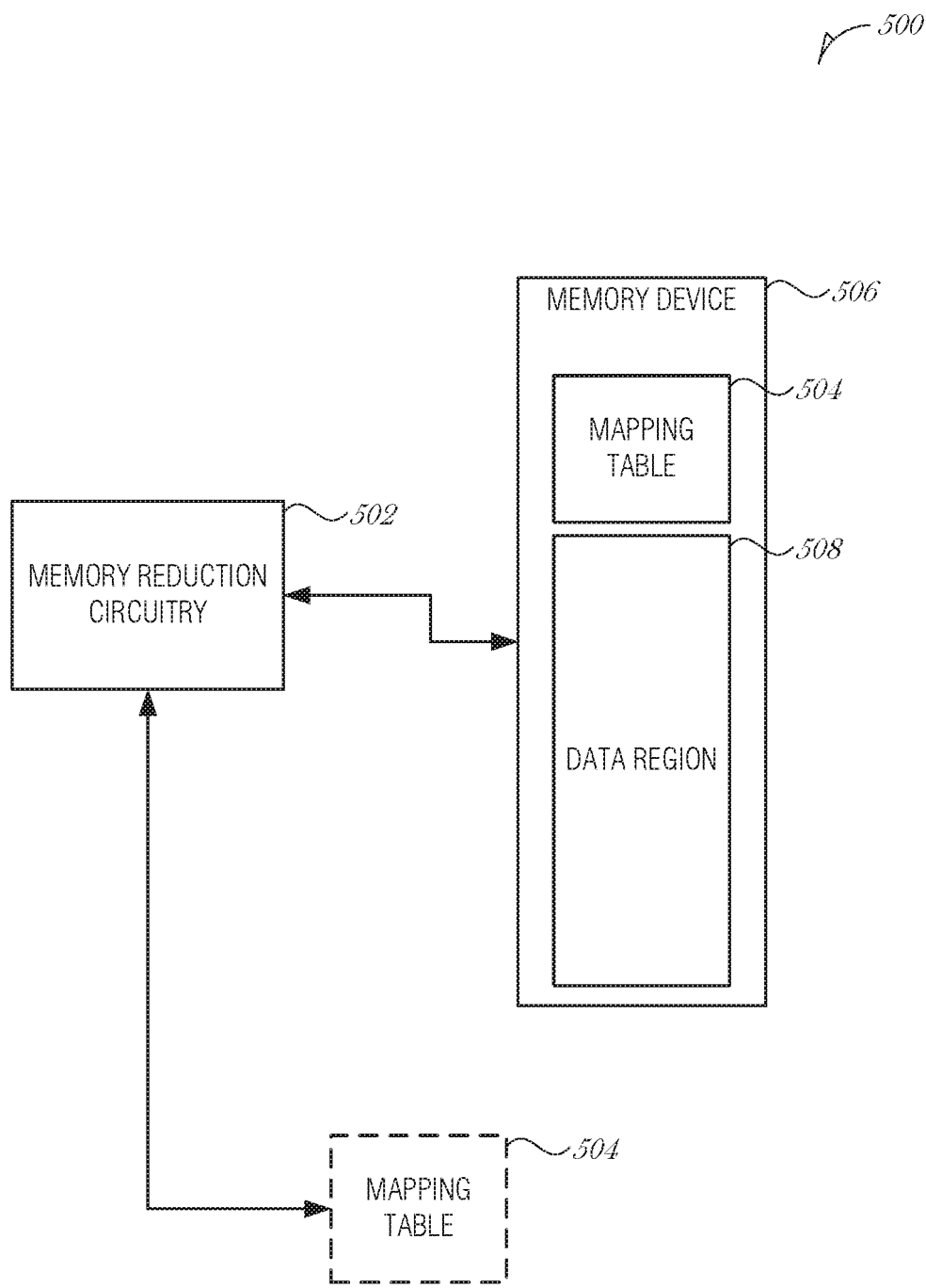
FIG. 5 is a block diagram illustrating an architecture, according to an embodiment.

FIG. 5 is a block diagram illustrating an architecture 500, according to an embodiment. The architecture 500 includes a memory reduction circuitry 502 (e.g., memory reduction circuitry 206), a mapping table 504, and a memory device 506 (e.g., memory 204). The memory device 506 stores a data region 508. The data region 508 stores the data contents that are written into the memory system. The data stored may be compressed, deduplicated, or both. In some implementations, the memory device 506 also stores the mapping table 504 in a separate area from the data region 508. In yet other implementations, the mapping table 504 may be stored on a separate device from the data region 508.

The memory reduction circuitry 502 supports various memory reduction techniques, such as compression or deduplication. To service an address request received from a requester, for example a CPU, the memory reduction circuitry 502 references the mapping table 504 to indirect into the data region of the memory device 506. The memory reduction circuitry 502 manages all accesses to the memory device 506. This hardware intercepts all traffic, and implements the logic to (1) determine where the data for an address resides, and (2) store and free data in the data region 508 as necessary.

The mapping table 504 includes mappings from address space to data space, or in other words, from logical address space to physical data space. In an embodiment, the mapping table 504 is a table of pointers that map system addresses from the CPU to the location of the compressed or deduplicated data on the physical memory device 506. In the simplest embodiment, the mapping table 504 maps fixed-size chunks of the address space into compressed or deduplicated chunks in the data region 508 on the memory device 506.

Figure 6:
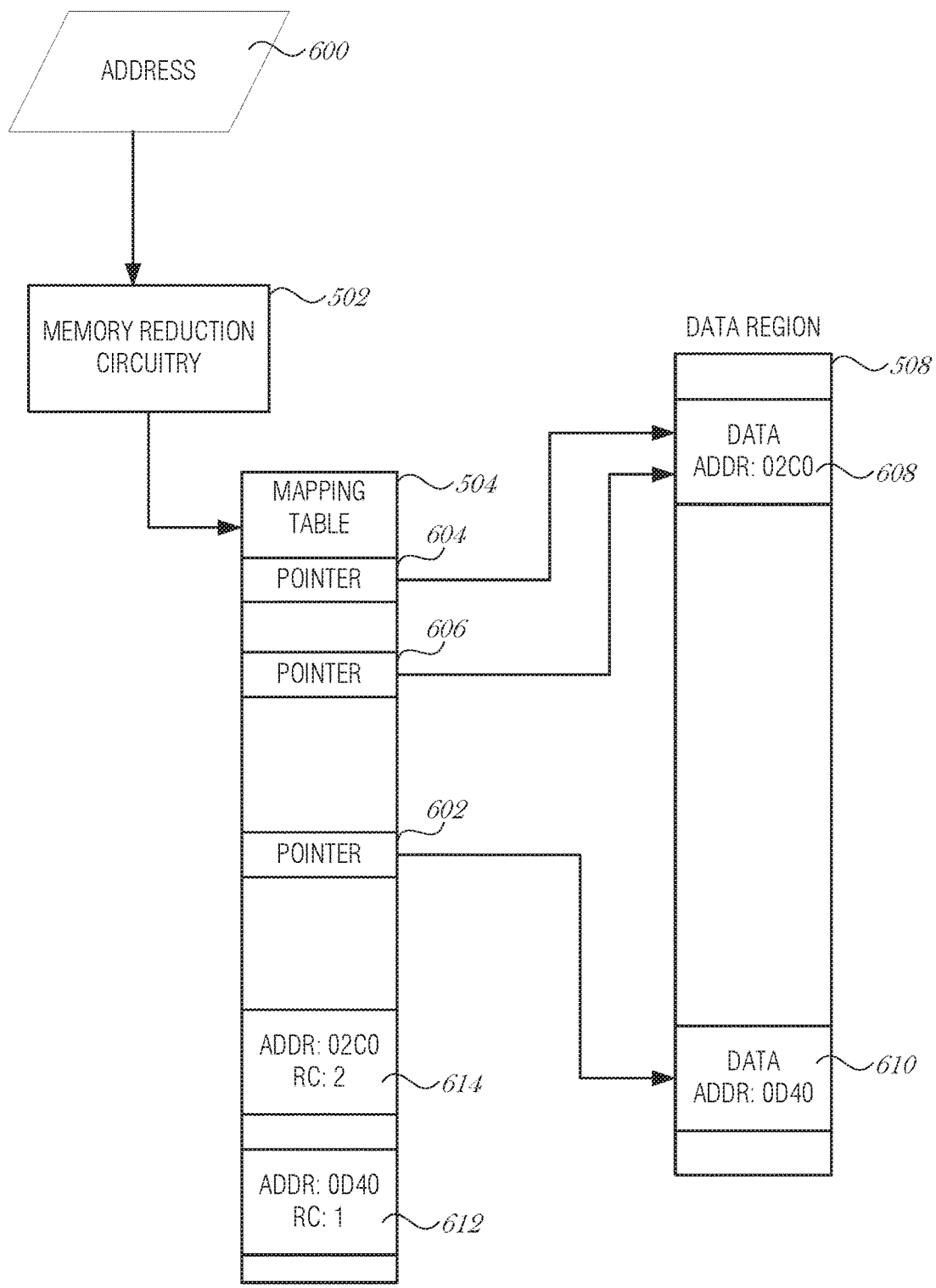
FIG. 6 is a block diagram illustrating mapping table and data region use, according to an embodiment.

FIG. 6 is a block diagram illustrating mapping table 504 and data region 508 use, according to an embodiment. An address 600 is received by the memory reduction circuitry 502, and the memory reduction circuitry 502 may refer to the mapping table 504 to determine the physical address in the data region 508. As illustrated, a given portion of the data region 508 may be pointed to by one pointer (e.g., data 610 is pointed to by pointer 602) or by several pointers (e.g., data 608 is pointed to by pointers 604 and 606). When data is referenced by several pointers, this is an illustration of deduplication (both pointers 604 and 606 point to the same data), thereby reducing the overall memory usage in the data region 508. Data in data blocks may also be compressed, depending on the implementation, which would provide an even higher memory compression ratio.

The mapping table 504 also includes a portion that maintains records of the data regions and how many pointers are pointing to a particular data region. The number of pointers pointing to a portion of the data region is referred to as the "reference count" of that data region. The data regions are typically cache lines in memory, but may be allocated in other granularities.

When a pointer 606 is added to the mapping table 504 that points to data 612 (effectively deduplicating the data), a record 614 in the mapping table 504 is added or updated to indicate the number of pointers pointing at the physical address in the data region (e.g., the reference count). Assuming 4 KB pages, and 64-byte cache lines, each cache line boundary aligns with 0x0040 data addresses. The data 612 is a cache line in a memory page, in this example.

When data is deleted such that the reference count goes to zero, then the reference count record in the mapping table 504 is deleted. The reference count records in the mapping table 504 may be stored in a contiguous section with sequential addresses. This provides an easier way to scan the mapping table and tabulate the various reference counter metrics.

Figure 7:
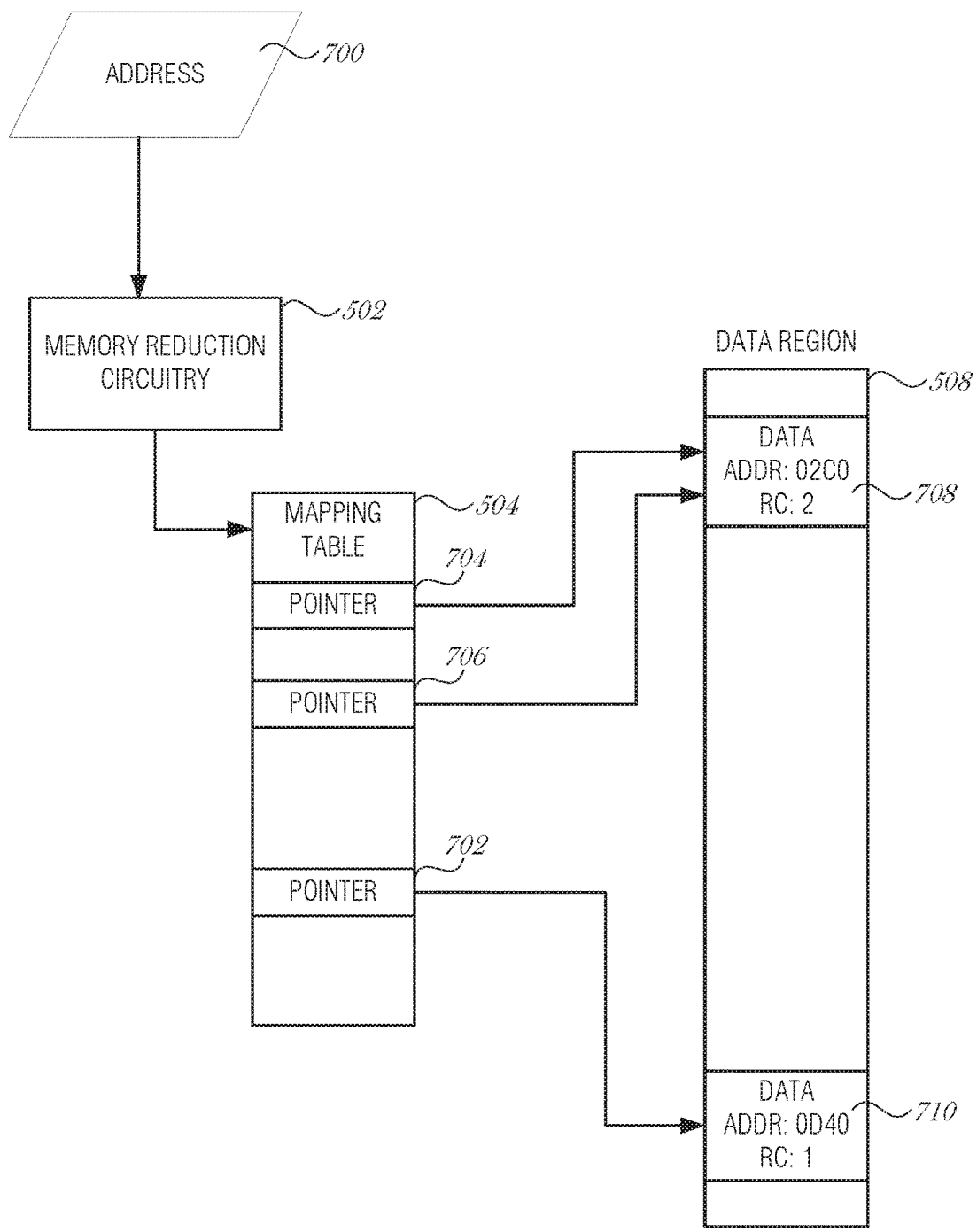
FIG. 7 is a block diagram illustrating mapping table and data region use, according to an embodiment.

FIG. 7 is a block diagram illustrating mapping table 504 and data region 508 use, according to an embodiment. Similar to the arrangement found in FIG. 6, the memory reduction circuitry 502 accesses the mapping table 504 to update pointers that indirect into the data region 508. However, instead of reference counter records stored in the mapping table 504 (e.g., records 612 and 614 of FIG. 6), the reference count information is stored with the data in the data region 508. For instance, a 4-bit field is used in a header of the data that indicates the reference count for the associated data. When an address 700 is received by the memory reduction circuitry 502, pointers 702, 704, or 706 are added or removed during writes or updates to the data region 508, and the reference count in the associated data (e.g., data 708 or data 710) are updated.

Figure 8:
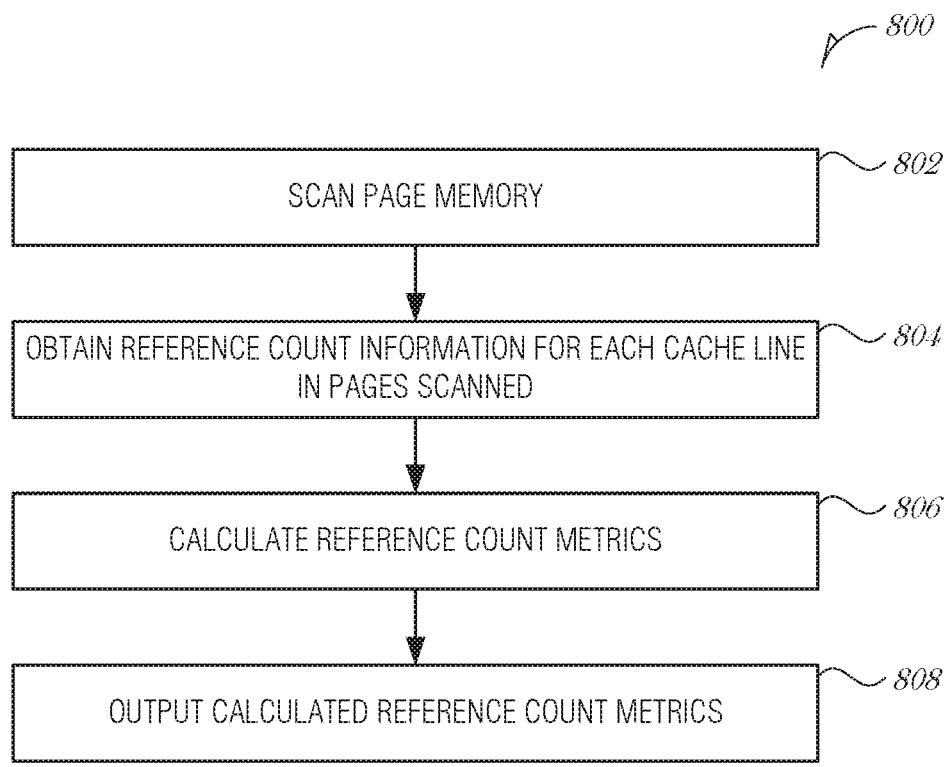
FIG. 8 is a block diagram illustrating a process for obtaining reference count information from hardware, according to an embodiment.

FIG. 8 is a block diagram illustrating a process 800 for obtaining reference count information from hardware, according to an embodiment. The process 800 may be performed in hardware, such as at a memory controller or reference count information collection circuitry 208 of FIG. 2. At 802, page memory is scanned. The range of addresses may be provided to the acting hardware circuit. As described in FIG. 4, the memory range may be provided with a start address and a size. The page memory is scanned in a contiguous block of memory.

At 804, the reference count information for each cache line in the pages scanned is obtained. Reference count information may be stored in a separate area (e.g., mapping table 504) or with the data (e.g., in a data header block). The reference count information is the number of pointers that point to the physical block of data.

At 806, reference count metrics are calculated. The metrics calculated may be on-demand, such that depending on which metrics the calling entity (e.g., operating system software) requests, the acting circuitry may calculate certain metrics. Possible metrics include, but are not limited to the number of lines that have a reference count of 1, the total reference count for all lines scanned, the average reference count, the highest reference count of any one line, or the number of lines that have equal to or less than a provided reference count threshold.

At 808, the calculated reference count metrics are output. The reference count metrics may be provided as return variables, such as in a procedure call to the acting circuitry. Alternatively, the reference count metrics may be passed by register, using one or more shared registers between the acting circuitry and operating system software or other calling entity.

Figure 9:
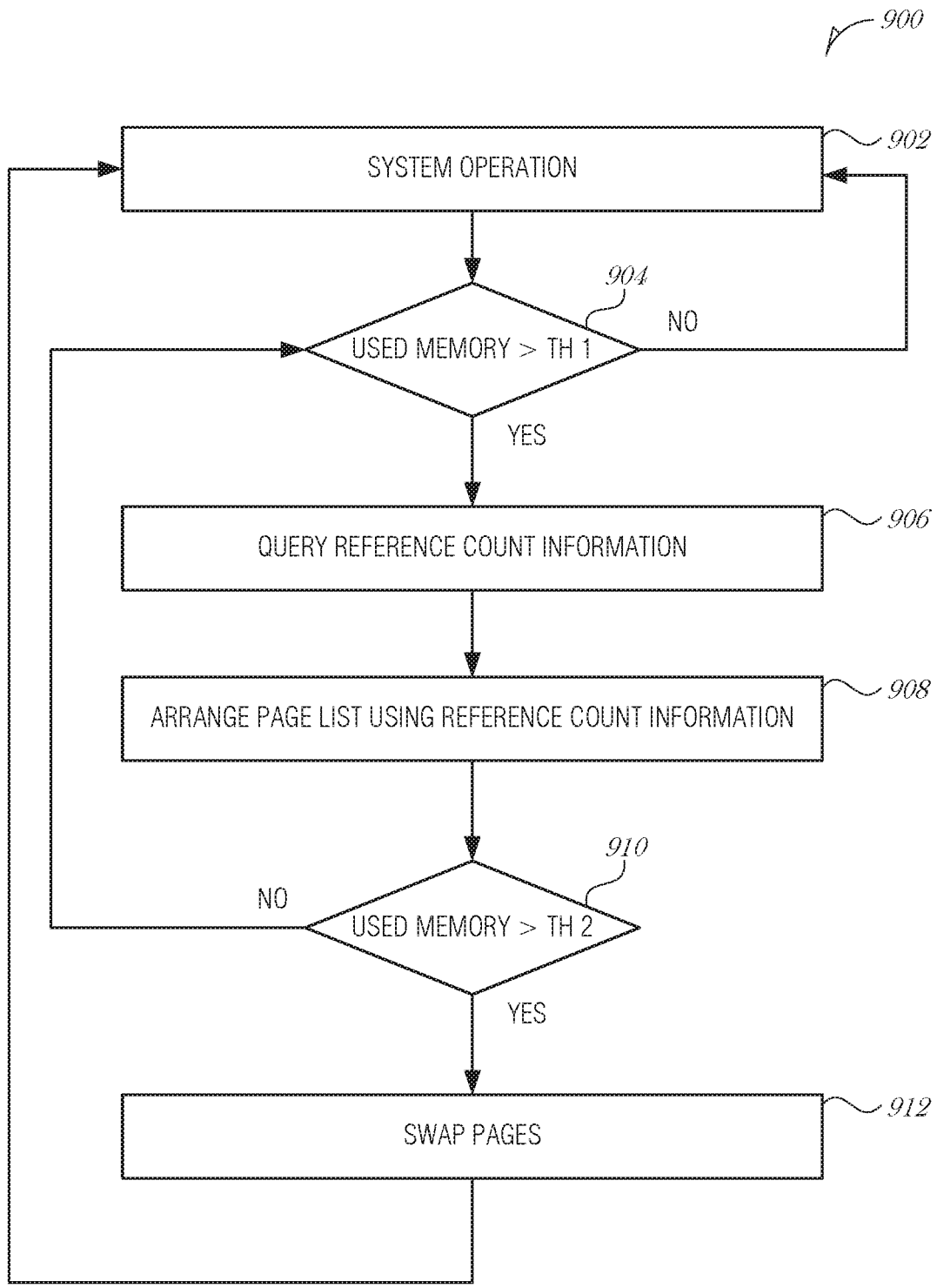
FIG. 9 is a block diagram illustrating a process for requesting and using reference count information, according to an embodiment.

FIG. 9 is a block diagram illustrating a process 900 for requesting and using reference count information, according to an embodiment. The process 900 may be called by system software, a library, a device driver, or other low-level operating software. The process 900 allows the calling entity to obtain information about the underlying hardware state to make better decisions on which pages to swap out when there is memory pressure.

FIG. 9 illustrates how system software may use the collected information to guide its paging activities. In this example, there are two threshold values for available free memory. If the amount of used memory is greater than a first threshold, system software starts using the reference count information engine (e.g., reference count information collection circuitry 208) to collect necessary information and re-arrange the list of candidate pages. If the amount of used memory goes above a second threshold, then system software starts using the arranged page list to swap candidate pages to secondary storage. For instance, the first threshold may be 60% and the second threshold may be 85%. In such an example, when the used memory exceeds 60%, then the system software begins collecting reference count information and when the used memory exceeds 85%, the system software begins paging.

While a "used memory" metric is implemented in this example process 900, it is understood that a "free memory" metric may be used instead. The thresholds and comparisons of such thresholds would be inverted in such an implementation. For instance, instead of thresholding on 60% memory used, the system may threshold on 40% of free memory remaining.

The process 900 includes state 902, where system operation progresses normally. At some time, the first threshold is evaluated (operation 904). This may be performed periodically, such as every 500 ms, or due to receiving notifications (e.g., interrupts) from hardware, or the like. If the amount of used memory does not exceed the first threshold (TH1), then the process 900 returns to the state 902, where it continues to execute normally.

If the used memory is over the first threshold (TH1), then reference count information is obtained from hardware (operation 906). This may be performed in the manner described in FIGS. 1-8 and associated text.

A candidate page list is arranged using reference count information as at least one factor in the arrangement (operation 908). Candidate pages are those that may be paged out. For instance, pages may be sorted first on least-recently used (LRU) metrics and then on pages with the lowest total reference count. Other reference count information may be used to order the candidate page list, such as by number of lines with reference count value of one, an average reference count, a maximum reference count, or the like. Additionally, several reference count metrics may be combined to form a combined metric, which may be used to sort candidate pages. The combined metric may be calculated using a weighted function of reference count metrics.

During or after the reference count information is gathered and used (operations 906 and 908), the second threshold is tested (operation 910). If the amount of memory used is below the second threshold (TH2), then the process 900 returns to the first threshold evaluation (operation 904). In this manner, the pages in the candidate page list may be sorted and resorted as reference count and page access information is revised.

If the amount of memory used is above the second threshold (TH2), then page swapping commences (operation 912). Page swapping may be performed using conventional methods. However, pages are selected based on a candidate page list that is ordered, at least in part, based on reference count information.

While many examples and embodiments are described in this document using reference count information, which is used in a deduplicated memory scheme, it is understood that the mechanisms described herein may be adapted for use in a memory compression environment. If using compressed memory, then each block of data in the data space includes an indication of compressed size, instead of a reference count value. The indication of compressed size may include a compression ratio, a size of a compressed block, a percentage of space the compressed data block uses in comparison to an uncompressed data block, or the like. Compression metrics may be used in a manner similar to reference counts. Pages with a higher degree of compression will be slower to page out to a backing store. This information is useful for ranking candidate pages for swapping.

Figure 10:
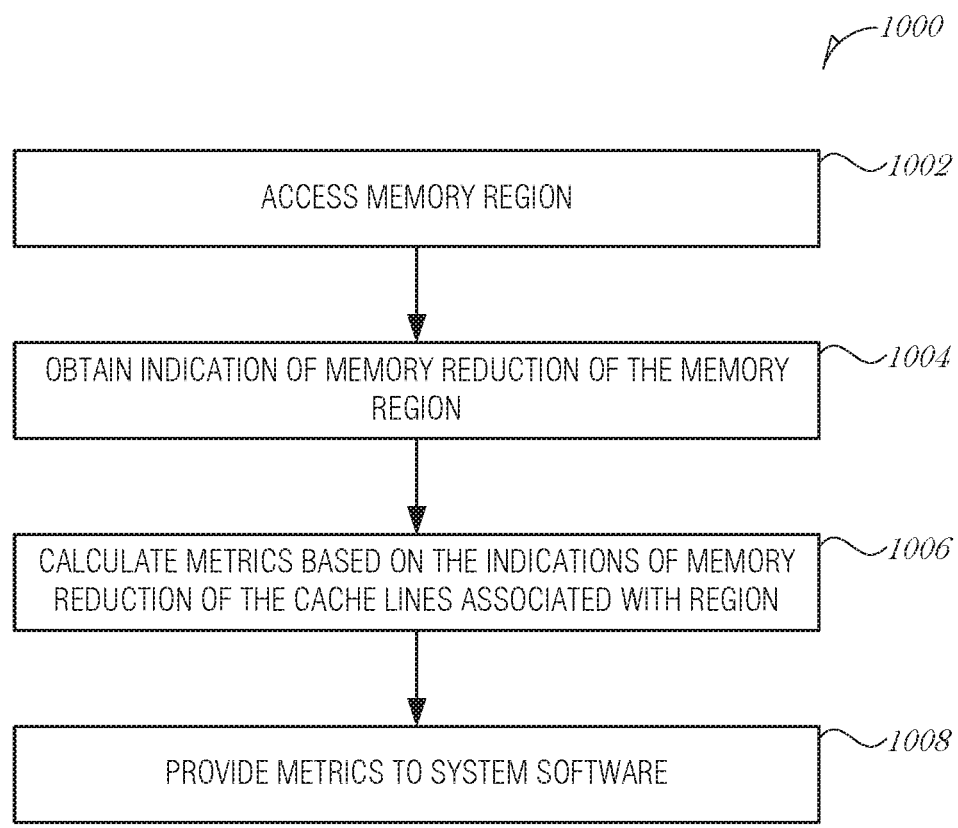
FIG. 10 is a flowchart illustrating a method for computer memory management, according to an embodiment.

FIG. 10 is a flowchart illustrating a method 1000 for computer memory management, according to an embodiment. The method 1000 may be performed by the reference count information collection circuitry 208 of FIG. 2, for example.

At 1002, a memory region is accessed from processing circuitry, the memory region subject to a memory reduction technique. In an embodiment, the memory region is a memory page. In an embodiment, the memory reduction technique includes memory deduplication.

At 1004, an indication of memory reduction of the memory region is obtained. In an embodiment, the indication of memory reduction is a reference count, the reference count enumerating a number of logical addresses that point to a physical address of a cache line of the cache lines associated with the memory region. In a further embodiment, obtaining the indication of memory reduction of the memory region comprises accessing a mapping table, the mapping table including a first portion that maintains mapping between logical and physical addresses, and a second portion that maintains a reference count of cache lines associated with the physical addresses.

In another embodiment, obtaining the indication of memory reduction of the memory region comprises accessing a header of a cache line of the cache lines, the header used to maintain a reference count associated with the cache line.

In another embodiment, obtaining the indication of memory reduction of the memory region comprises accessing a separate region of the memory containing information of the reference counts associated with each cache line.

At 1006, metrics based on the indication of memory reduction of cache lines associated with the memory region are calculated.

In an embodiment, calculating metrics based on the indication of memory reduction of the cache lines associated with the memory region comprises calculating a number of cache lines with a reference count value of one.

In another embodiment, calculating metrics based on the indication of memory reduction of the cache lines associated with the memory region comprises calculating a number of cache lines with a reference count fewer than a reference count threshold.

In another embodiment, calculating metrics based on the indication of memory reduction of the cache lines associated with the memory region comprises calculating a maximum reference count found across the cache lines.

In another embodiment, calculating metrics based on the indication of memory reduction of the cache lines associated with the memory region comprises calculating a sum of reference counts for the cache lines.

In another embodiment, calculating metrics based on the indication of memory reduction of the cache lines associated with the memory region comprises calculating an average reference count for the cache lines.

At 1008, the metrics are provided to a system software component for use in memory management mechanisms. In an embodiment, the memory region is a page, and the memory management mechanisms comprise paging mechanisms.

Alternatively, the memory reduction technique includes memory data compression. In a further embodiment, the indication of memory reduction is a compression amount, the compression amount representing an amount of data compression of the cache lines associated with the memory region.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

FIG. 11 is a block diagram illustrating a machine in the example form of a computer system 1100, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, gyrometer, magnetometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The figures below detail architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual September 2014; and see Intel® Advanced Vector Extensions Programming Reference, October 2014).

Instruction Formats

Embodiments of the instruction(s) described herein may be embodied in different formats. Additionally, systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12B:
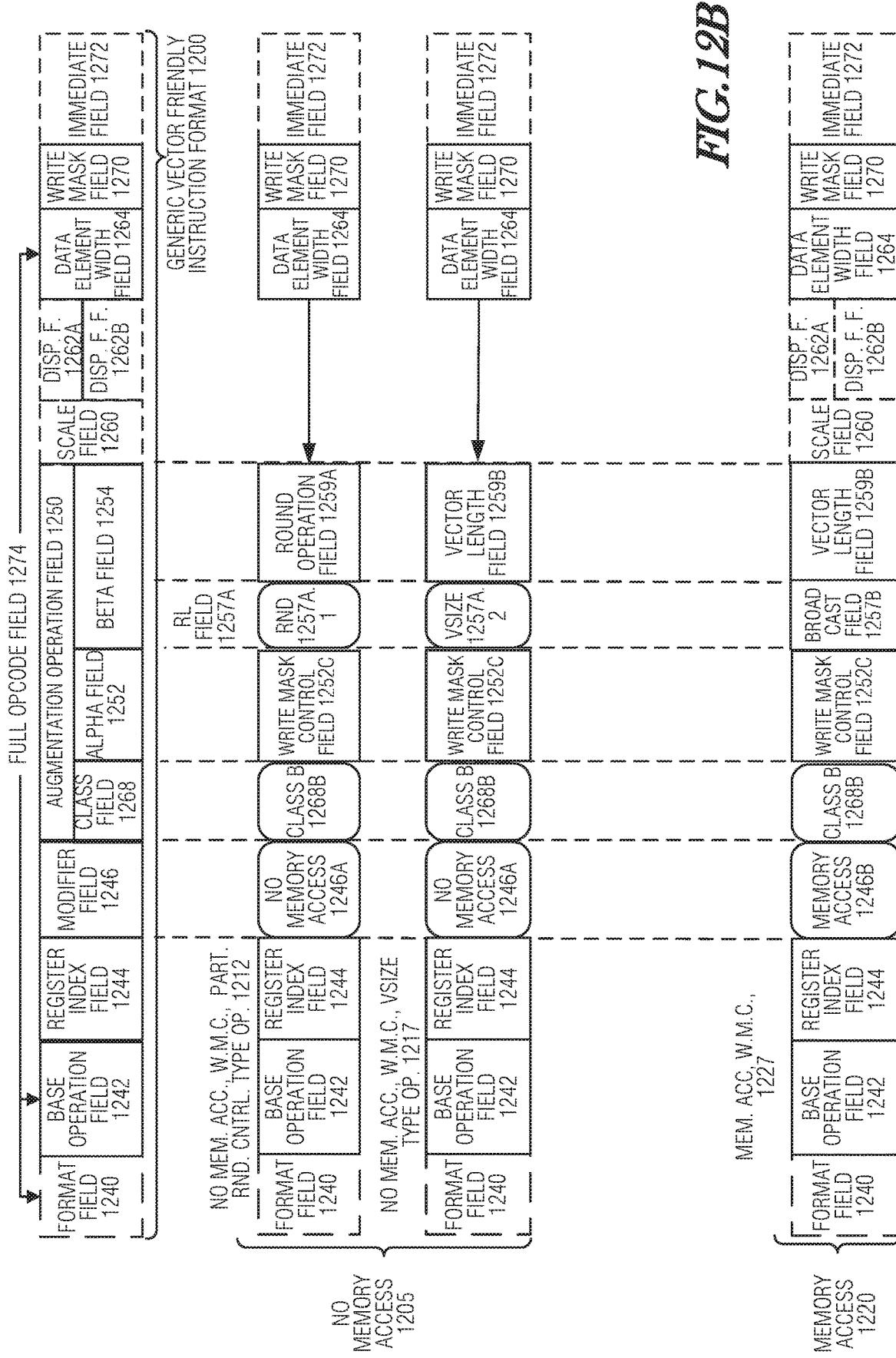

FIGS. 12A-12B are block diagrams illustrating a generic vector friendly instruction format and instruction templates thereof according to an embodiment. FIG. 12A is a block diagram illustrating a generic vector friendly instruction format and class A instruction templates thereof according to an embodiment; while FIG. 12B is a block diagram illustrating the generic vector friendly instruction format and class B instruction templates thereof according to an embodiment. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in an embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in an embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In an embodiment, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses 2scale*index+base).

Displacement Field 1262A—its content is used as part of memory address generation (e.g., for address generation that uses 2scale*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in another embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in an embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-12B, the contents of this field select between class A and class B instructions. In FIGS. 12A-12B, rounded corner squares are used to indicate a specific value is present in a field (e.g., class A 1268A and class B 1268B for the class field 1268 respectively in FIGS. 12A-12B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down. Round-towards-zero and Round-to-nearest). Thus, the round operation control field 1258 allows for the changing of the rounding mode on a per instruction basis. In an embodiment where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control. VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In an embodiment where a processor includes a control register for specifying rounding modes, the round operation control field's 1250 content overrides that register value.

In the no memory access, write mask control VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Specific Vector Friendly Instruction Format

FIG. 13 is a block diagram illustrating a specific vector friendly instruction format according to an embodiment. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field. SIB field, displacement field, and immediate fields of the existing x86 instruction set with extensions. The fields from FIG. 12 into which the fields from FIG. 13 map are illustrated.

It should be understood that, although embodiments are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in an embodiment).

The second-fourth bytes (EVEX Bytes 1-3) include a number of bit fields providing specific capability.

REX field 1305 (EVEX Byte 1, bits [7-5])—consists of an EVEX.R bit field (EVEX Byte 1, bit [7]-R), EVEX.X bit field (EVEX byte 1, bit [6]-X), and 1257BEX byte 1, bit [5]-B). The EVEX.R, EVEX.X, and EVEX.B bit fields provide the same functionality as the corresponding VEX bit fields, and are encoded using 1s complement form, i.e. ZMM0 is encoded as 1111B. ZMM15 is encoded as 0000B. Other fields of the instructions encode the lower three bits of the register indexes as is known in the art (rrr, xxx, and bbb), so that Rrrr. Xxxx, and Bbbb may be formed by adding EVEX.R. EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In an embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus. EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)— provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In an embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH. EVEX.rs, EVEX.RL, EVEX.write mask control and EVEX.N: also illustrated with α)—as previously described, this field is context specific.

Beta field 1254 (EVEX byte 3, bits [6:4]-SSS, also known as EVEX.s2-0. EVEX.r2-0, EVEX.rr1. EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In an embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale. Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used: however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to an embodiment. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to an embodiment. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
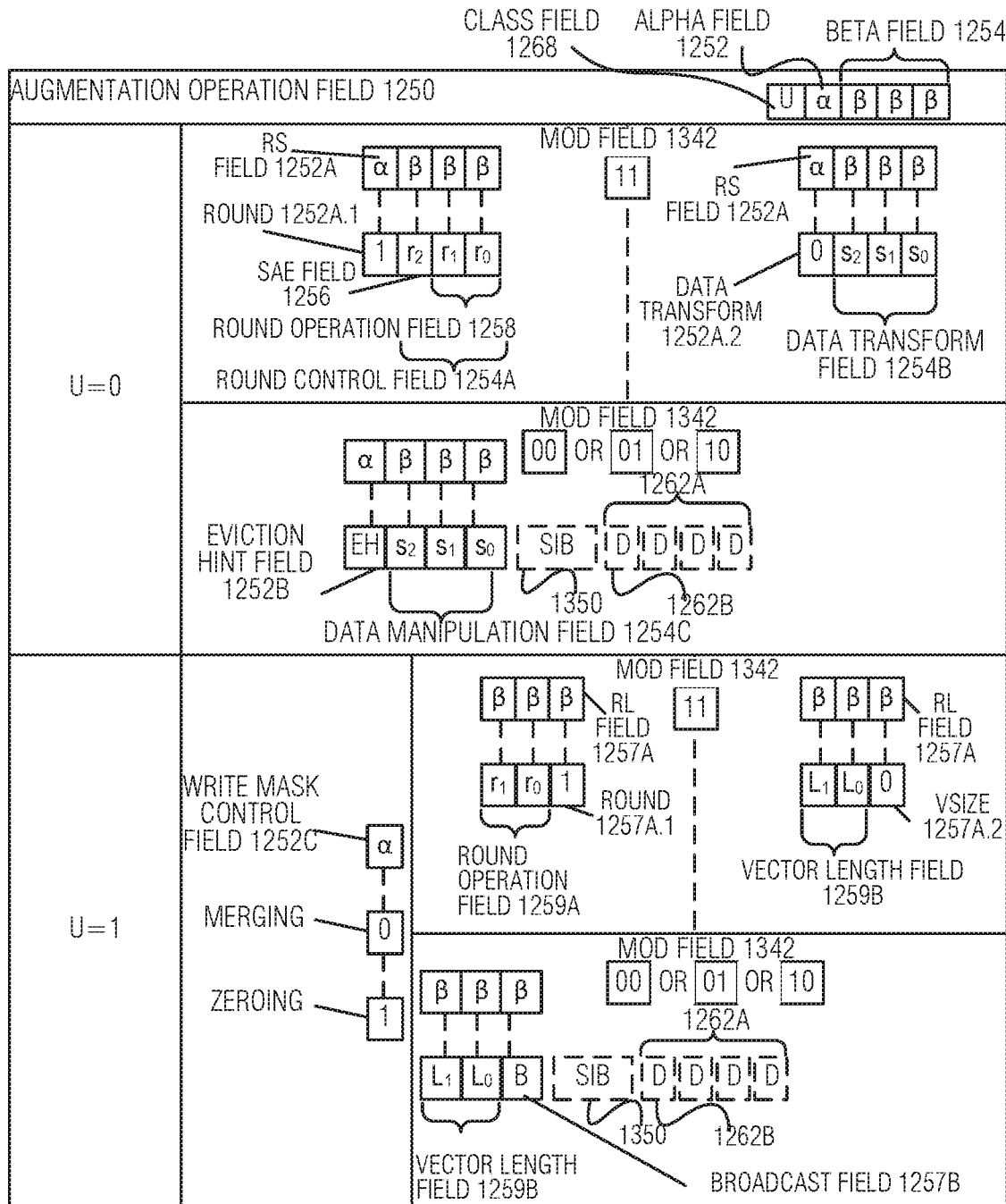

FIG. 13D is a block diagram illustrating the fields of the specific vector friendly instruction format 1300 that make up the augmentation operation field 1250 according to an embodiment. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-S0) is interpreted as the RL field 1257A; when it contains a 1 (round 1257A.1) the rest of the beta field 1254 (EVEX byte 3, bit [6-5]-S2-1) is interpreted as the round operation field 1259A, while when the RL field 1257A contains a 0 (VSIZE 1257.A2) the rest of the beta field 1254 (EVEX byte 3, bit [6-5]-S2-1) is interpreted as the vector length field 1259B (EVEX byte 3, bit [6-5]-L1-0). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-L1-0) and the broadcast field 1257B (EVEX byte 3, bit [4]—B).

Register Architecture

Figure 14:
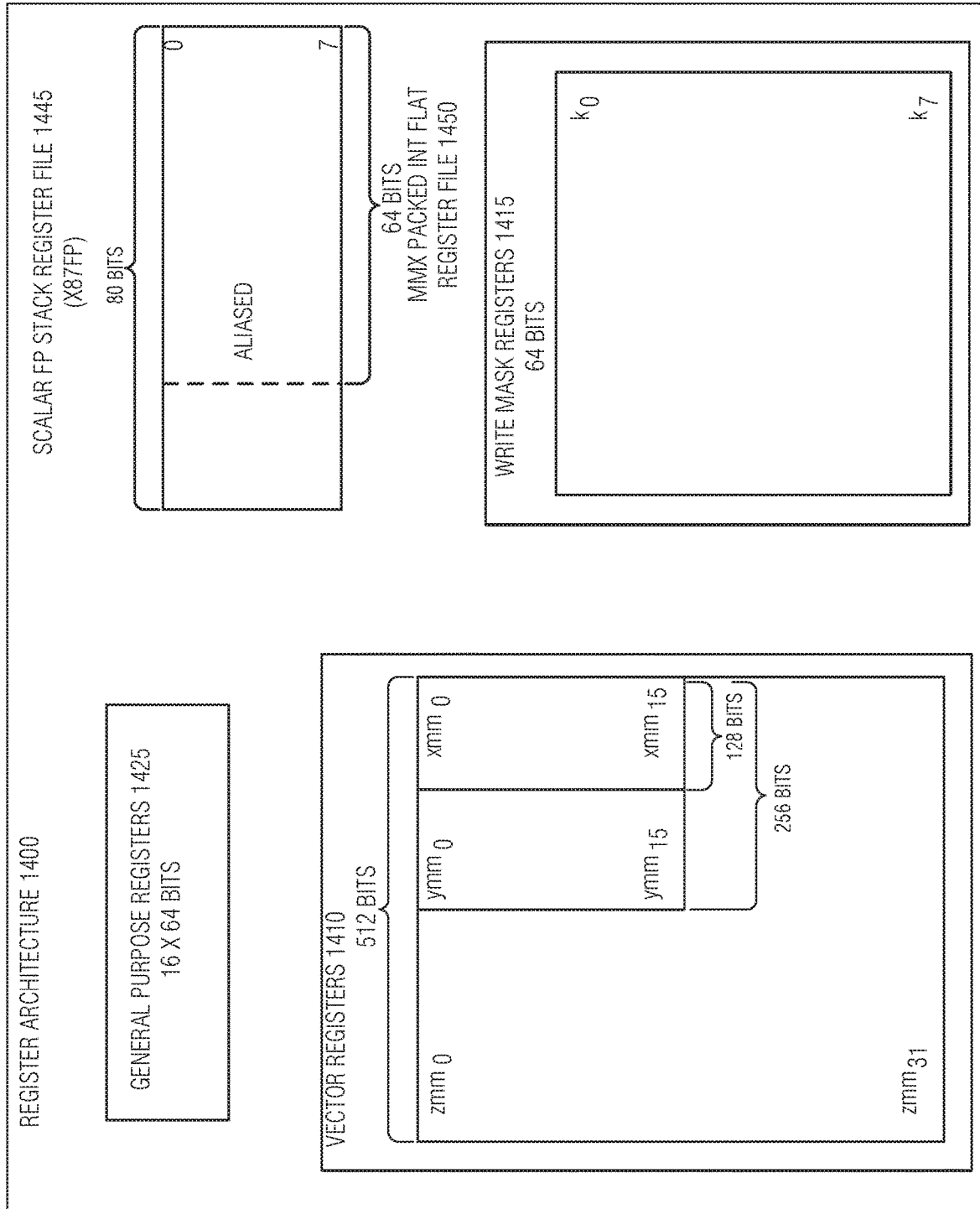
FIG. 14 is a block diagram of a register architecture according to an embodiment.

FIG. 14 is a block diagram of a register architecture 1400 according to an embodiment. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in an embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in an embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing;

and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Core architectures are described next, followed by descriptions of processors and computer architectures.

Core Architectures

In-Order and Out-of-Order Core Block Diagram

FIG. 15A is a block diagram illustrating both an in-order pipeline and a register renaming, out-of-order issue/execution pipeline according to embodiments. FIG. 15B is a block diagram illustrating both an embodiment of an in-order architecture core and a register renaming, out-of-order issue/execution architecture core to be included in a processor according to an embodiment. The solid lined boxes in FIGS. 15A-15B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In an embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In an embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In an embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514: the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In an embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific In-Order Core Architecture

Figure 16B:
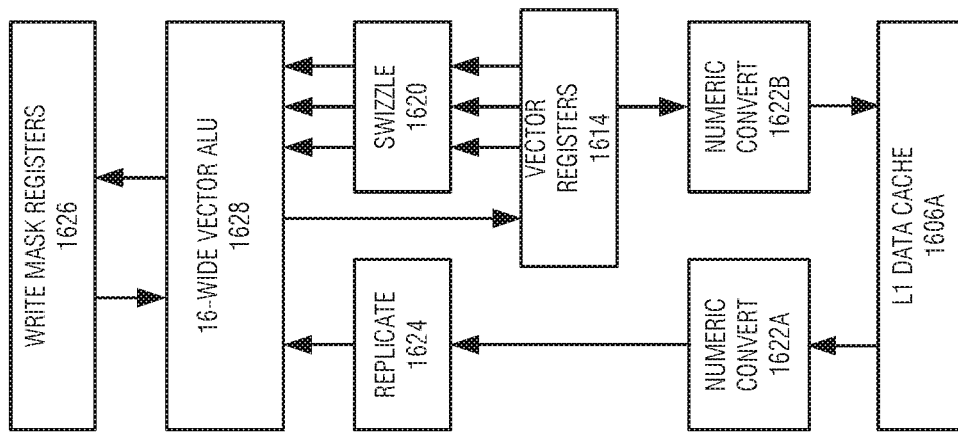
FIGS. 16A-16B illustrate block diagrams of a more specific in-order core architecture, which core would be one of several logic blocks (including other cores of the same type and/or different types) in a chip, according to an embodiment.
Figure 16A:
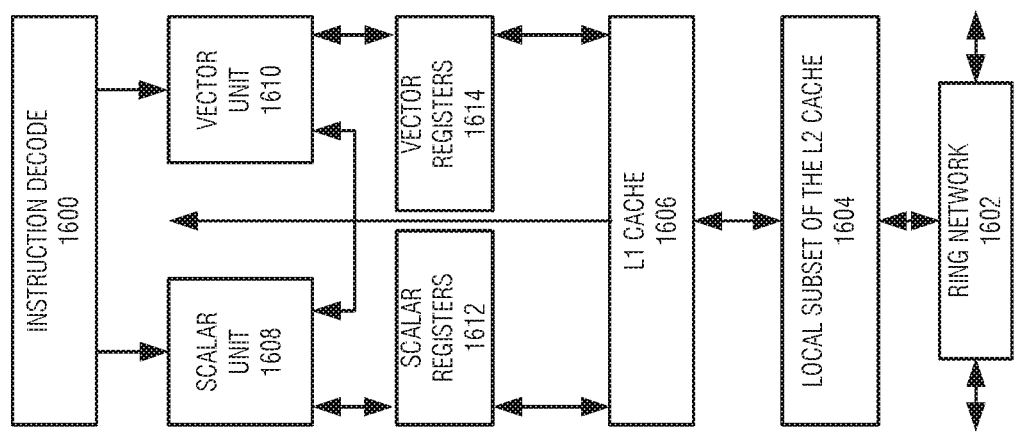

FIGS. 16A-16B illustrate a block diagram of a more specific in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to an embodiment. In an embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to an embodiment. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
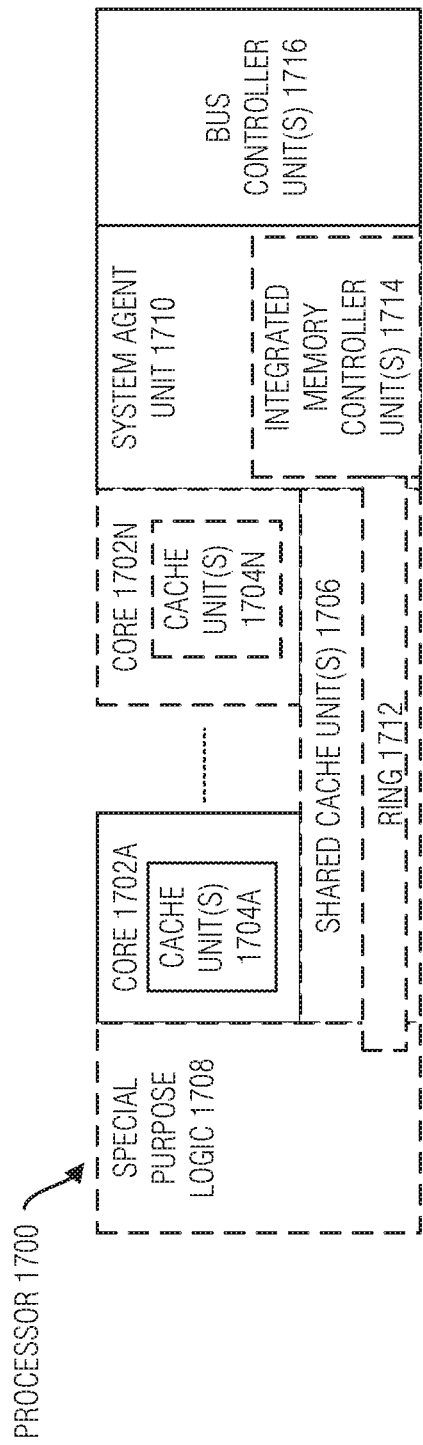
FIG. 17 is a block diagram of a processor that may have more than one core, may have an integrated memory controller, and may have integrated graphics according to an embodiment.

FIG. 17 is a block diagram of a processor 1700 that may have more than one core, may have an integrated memory controller, and may have integrated graphics according to embodiments. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two): 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In an embodiment, coherency is maintained between one or more cache units 1704A-N and cores 1702A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Computer Architectures

FIGS. 18-21 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 18, shown is a block diagram of a system 1800 according to an embodiment. The system 1800 may include one or more processors 1810, 1815, which are coupled to a controller hub 1820. In an embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In an embodiment, the coprocessor 1845 is a special-purpose processor, such as, for example, a high-throughput MIC processor, a network or communication processor, compression engine, graphics processor, GPGPU, embedded processor, or the like. In an embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In an embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
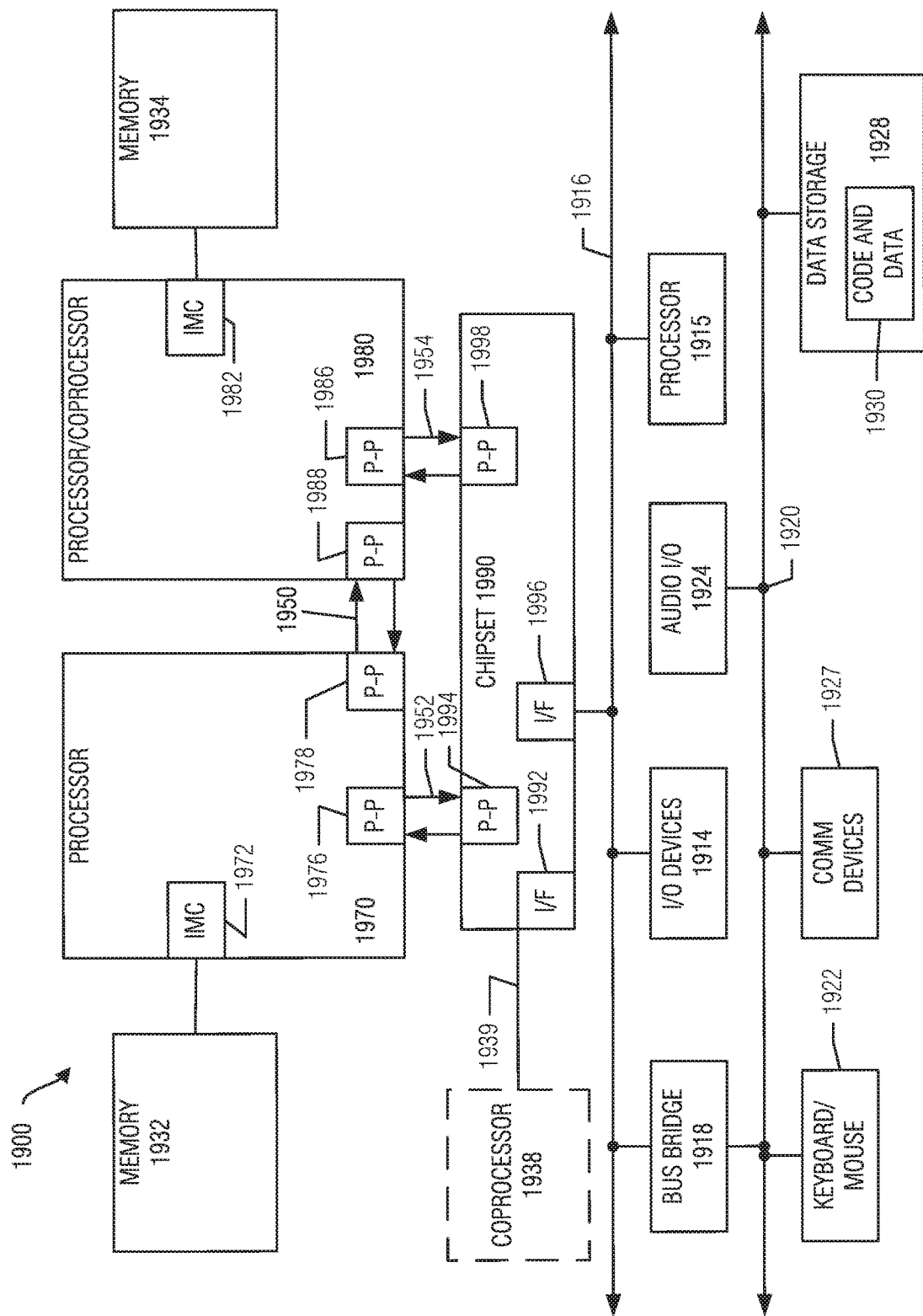

Referring now to FIG. 19, shown is a block diagram of a first more specific system 1900 in accordance with an embodiment. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In an embodiment, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19. IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In an embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In an embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In an embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In an embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in an embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
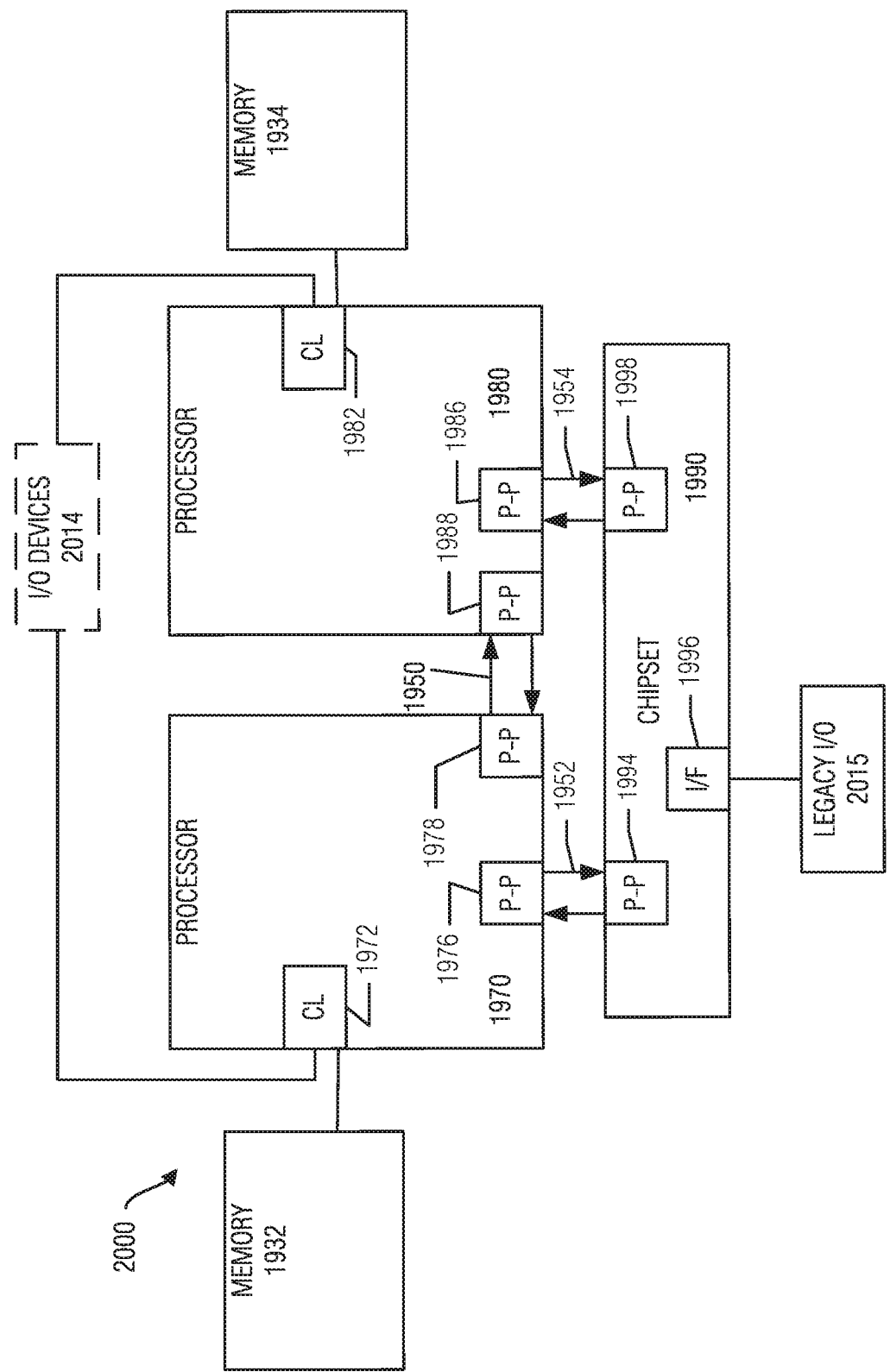

Referring now to FIG. 20, shown is a block diagram of a second more specific system 2000 in accordance with an embodiment. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
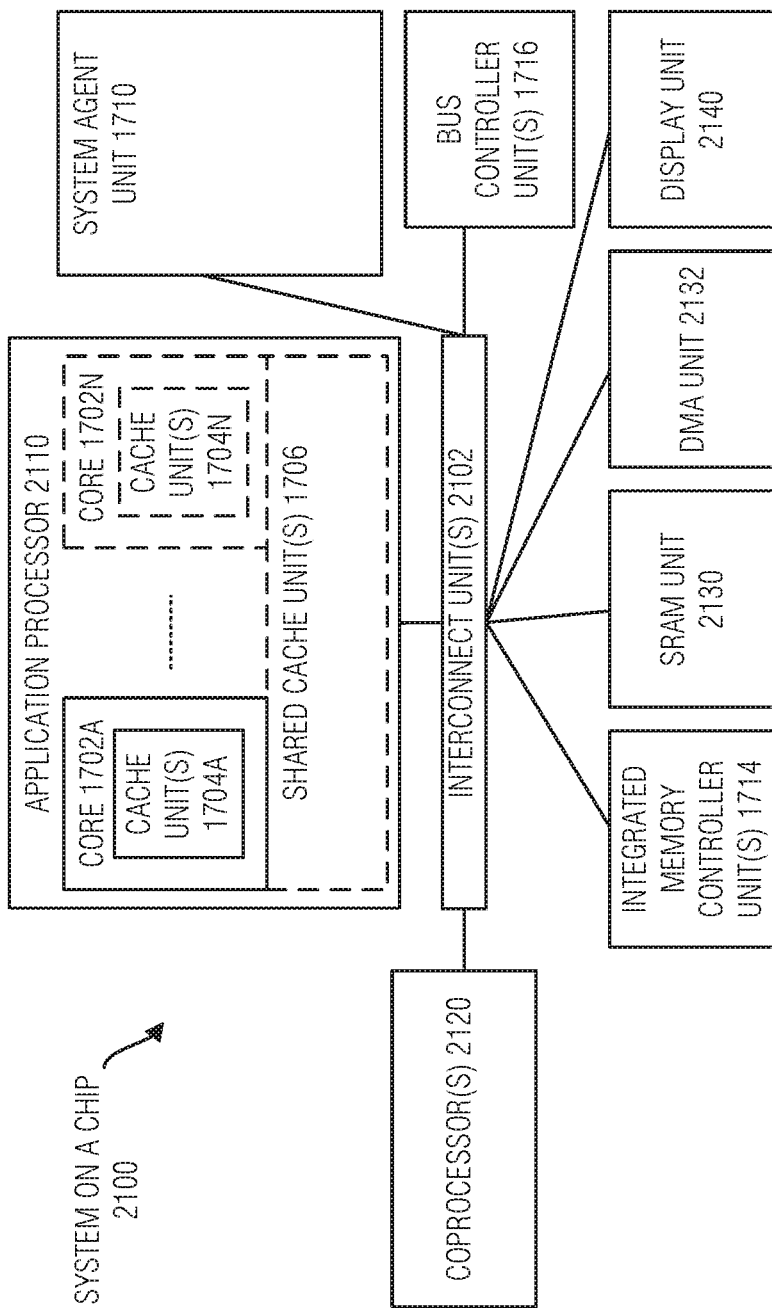

Referring now to FIG. 21, shown is a block diagram of a SoC 2100 in accordance with an embodiment. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N with integrated cache units 1704A-N and shared cache unit(s) 1706: a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In an embodiment, the coprocessor(s) 2120 include a special-purpose processor, such as, for example, a network or communication processor, compression engine. GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
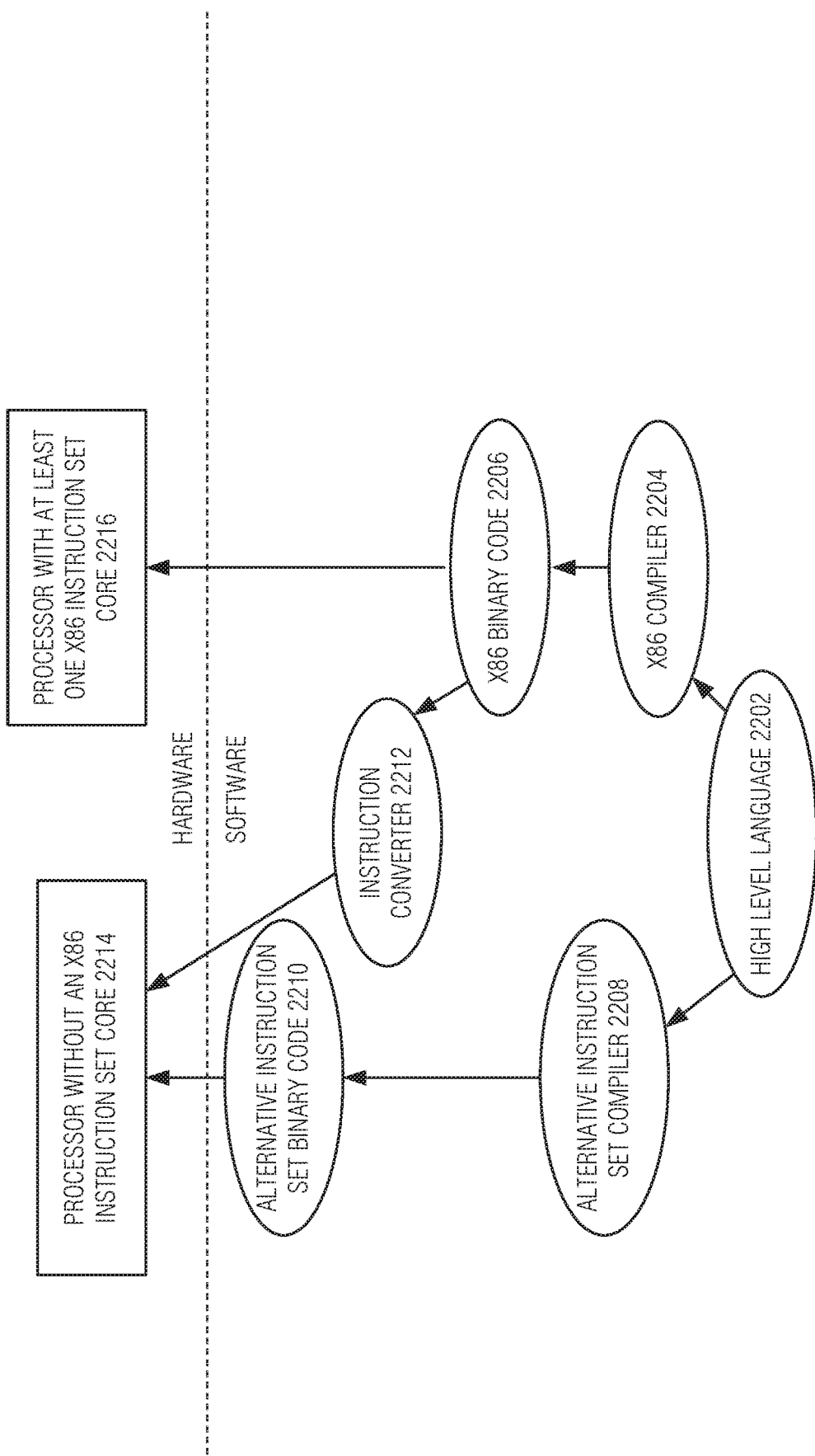
FIG. 22 is a block diagram contrasting the use of a software instruction converter to convert binary instructions in a source instruction set to binary instructions in a target instruction set according to an embodiment.

FIG. 22 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly. FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make: however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

Additional Notes & Examples

Example 1 is processing circuitry for computer memory management, the processing circuitry comprising: memory reduction circuitry to implement a memory reduction technique; and reference count information collection circuitry to: access a memory region, the memory region subject to the memory reduction technique; obtain an indication of memory reduction of the memory region; calculate metrics based on the indication of memory reduction of cache lines associated with the memory region; and provide the metrics to a system software component for use in memory management mechanisms.

In Example 2, the subject matter of Example 1 includes, wherein the memory region is a memory page.

In Example 3, the subject matter of Examples 1-2 includes, wherein the memory reduction technique includes memory deduplication.

In Example 4, the subject matter of Example 3 includes, wherein the indication of memory reduction is a reference count, the reference count enumerating a number of logical addresses that point to a physical address of a cache line of the cache lines associated with the memory region.

In Example 5, the subject matter of Example 4 includes, wherein to obtain the indication of memory reduction of cache lines, the reference count information collection circuitry is to: access a mapping table, the mapping table including a first portion that maintains mapping between logical and physical addresses, and a second portion that maintains a reference count of cache lines associated with the physical addresses.

In Example 6, the subject matter of Examples 4-5 includes, wherein to obtain the indication of memory reduction of the memory region, the reference count information collection circuitry is to: access a header of a cache line of the cache lines, the header used to maintain a reference count associated with the cache line.

In Example 7, the subject matter of Examples 4-6 includes, wherein to obtain the indication of memory reduction of the memory region, the reference count information collection circuitry is to: access a separate region of the memory containing information of the reference counts associated with each cache line.

In Example 8, the subject matter of Examples 4-7 includes, wherein to calculate metrics based on the indication of memory reduction of the cache lines associated with the memory region, the reference count information collection circuitry is to: calculate a number of cache lines with a reference count value of one.

In Example 9, the subject matter of Examples 4-8 includes, wherein to calculate metrics based on the indication of memory reduction of the cache lines associated with the memory region, the reference count information collection circuitry is to: calculate a number of cache lines with a reference count fewer than a reference count threshold.

In Example 10, the subject matter of Examples 4-9 includes, wherein to calculate metrics based on the indication of memory reduction of the cache lines associated with the memory region, the reference count information collection circuitry is to: calculate a maximum reference count found across the cache lines.

In Example 11, the subject matter of Examples 4-10 includes, wherein to calculate metrics based on the indication of memory reduction of the cache lines associated with the memory region, the reference count information collection circuitry is to: calculate a sum of reference counts for the cache lines.

In Example 12, the subject matter of Examples 4-11 includes, wherein to calculate metrics based on the indication of memory reduction of the cache lines associated with the memory region, the reference count information collection circuitry is to: calculate an average reference count for the cache lines.

In Example 13, the subject matter of Examples 1-12 includes, wherein the memory reduction technique includes memory data compression.

In Example 14, the subject matter of Example 13 includes, wherein the indication of memory reduction is a compression amount, the compression amount representing an amount of data compression of the cache lines associated with the memory region.

In Example 15, the subject matter of Examples 1-14 includes, wherein the memory region is a page, and wherein the memory management mechanisms comprise paging mechanisms.

Example 16 is a method of computer memory management, the method comprising: accessing, from processing circuitry a memory region, the memory region subject to a memory reduction technique; obtaining an indication of memory reduction of the memory region; calculating metrics based on the indication of memory reduction of cache lines associated with the memory region; and providing the metrics to a system software component for use in memory management mechanisms.

In Example 17, the subject matter of Example 16 includes, wherein the memory region is a memory page.

In Example 18, the subject matter of Examples 16-17 includes, wherein the memory reduction technique includes memory deduplication.

In Example 19, the subject matter of Example 18 includes, wherein the indication of memory reduction is a reference count, the reference count enumerating a number of logical addresses that point to a physical address of a cache line of the cache lines associated with the memory region.

In Example 20, the subject matter of Example 19 includes, wherein obtaining the indication of memory reduction of the memory region comprises: accessing a mapping table, the mapping table including a first portion that maintains mapping between logical and physical addresses, and a second portion that maintains a reference count of cache lines associated with the physical addresses.

In Example 21, the subject matter of Examples 19-20 includes, wherein obtaining the indication of memory reduction of the memory region comprises: accessing a header of a cache line of the cache lines, the header used to maintain a reference count associated with the cache line.

In Example 22, the subject matter of Examples 19-21 includes, wherein obtaining the indication of memory reduction of the memory region comprises: accessing a separate region of the memory containing information of the reference counts associated with each cache line.

In Example 23, the subject matter of Examples 19-22 includes, wherein calculating metrics based on the indication of memory reduction of the cache lines associated with the memory region comprises: calculating a number of cache lines with a reference count value of one.

In Example 24, the subject matter of Examples 19-23 includes, wherein calculating metrics based on the indication of memory reduction of the cache lines associated with the memory region comprises: calculating a number of cache lines with a reference count fewer than a reference count threshold.

In Example 25, the subject matter of Examples 19-24 includes, wherein calculating metrics based on the indication of memory reduction of the cache lines associated with the memory region comprises: calculating a maximum reference count found across the cache lines.

In Example 26, the subject matter of Examples 19-25 includes, wherein calculating metrics based on the indication of memory reduction of the cache lines associated with the memory region comprises: calculating a sum of reference counts for the cache lines.

In Example 27, the subject matter of Examples 19-26 includes, wherein calculating metrics based on the indication of memory reduction of the cache lines associated with the memory region comprises: calculating an average reference count for the cache lines.

In Example 28, the subject matter of Examples 16-27 includes, wherein the memory reduction technique includes memory data compression.

In Example 29, the subject matter of Example 28 includes, wherein the indication of memory reduction is a compression amount, the compression amount representing an amount of data compression of the cache lines associated with the memory region.

In Example 30, the subject matter of Examples 16-29 includes, wherein the memory region is a page, and wherein the memory management mechanisms comprise paging mechanisms.

Example 31 is at least one machine-readable medium including instructions, which when executed by a machine, cause the machine to perform operations of any of the methods of Examples 16-30.

Example 32 is an apparatus comprising means for performing any of the methods of Examples 16-30.

Example 33 is an apparatus for computer memory management, the apparatus comprising: means for accessing a memory region, the memory region subject to a memory reduction technique; means for obtaining an indication of memory reduction of the memory region; means for calculating metrics based on the indication of memory reduction of cache lines associated with the memory region; and means for providing the metrics to a system software component for use in memory management mechanisms.

In Example 34, the subject matter of Example 33 includes, wherein the memory region is a memory page.

In Example 35, the subject matter of Examples 33-34 includes, wherein the memory reduction technique includes memory deduplication.

In Example 36, the subject matter of Example 35 includes, wherein the indication of memory reduction is a reference count, the reference count enumerating a number of logical addresses that point to a physical address of a cache line of the cache lines associated with the memory region.

In Example 37, the subject matter of Example 36 includes, wherein the means for obtaining the indication of memory reduction of the memory region comprise: means for accessing a mapping table, the mapping table including a first portion that maintains mapping between logical and physical addresses, and a second portion that maintains a reference count of cache lines associated with the physical addresses.

In Example 38, the subject matter of Examples 36-37 includes, wherein the means for obtaining the indication of memory reduction of the memory region comprise: means for accessing a header of a cache line of the cache lines, the header used to maintain a reference count associated with the cache line.

In Example 39, the subject matter of Examples 36-38 includes, wherein the means for obtaining the indication of memory reduction of the memory region comprise: means for accessing a separate region of the memory containing information of the reference counts associated with each cache line.

In Example 40, the subject matter of Examples 36-39 includes, wherein the means for calculating metrics based on the indication of memory reduction of the cache lines associated with the memory region comprise: means for calculating a number of cache lines with a reference count value of one.

In Example 41, the subject matter of Examples 36-40 includes, wherein the means for calculating metrics based on the indication of memory reduction of the cache lines associated with the memory region comprise: means for calculating a number of cache lines with a reference count fewer than a reference count threshold.

In Example 42, the subject matter of Examples 36-41 includes, wherein the means for calculating metrics based on the indication of memory reduction of the cache lines associated with the memory region comprise: means for calculating a maximum reference count found across the cache lines.

In Example 43, the subject matter of Examples 36-42 includes, wherein the means for calculating metrics based on the indication of memory reduction of the cache lines associated with the memory region comprise: means for calculating a sum of reference counts for the cache lines.

In Example 44, the subject matter of Examples 36-43 includes, wherein the means for calculating metrics based on the indication of memory reduction of the cache lines associated with the memory region comprise: means for calculating an average reference count for the cache lines.

In Example 45, the subject matter of Examples 33-44 includes, wherein the memory reduction technique includes memory data compression.

In Example 46, the subject matter of Example 45 includes, wherein the indication of memory reduction is a compression amount, the compression amount representing an amount of data compression of the cache lines associated with the memory region.

In Example 47, the subject matter of Examples 33-46 includes, wherein the memory region is a page, and wherein the memory management mechanisms comprise paging mechanisms.

Example 48 is at least one machine-readable medium including instructions for computer memory management, the instructions when executed by processing circuitry, cause the processing circuitry to perform the operations comprising: accessing a memory region, the memory region subject to a memory reduction technique; obtaining an indication of memory reduction of the memory region; calculating metrics based on the indication of memory reduction of cache lines associated with the memory region; and providing the metrics to a system software component for use in memory management mechanisms.

In Example 49, the subject matter of Example 48 includes, wherein the memory region is a memory page.

In Example 50, the subject matter of Examples 48-49 includes, wherein the memory reduction technique includes memory deduplication.

In Example 51, the subject matter of Example 50 includes, wherein the indication of memory reduction is a reference count, the reference count enumerating a number of logical addresses that point to a physical address of a cache line of the cache lines associated with the memory region.

In Example 52, the subject matter of Example 51 includes, wherein obtaining the indication of memory reduction of the memory region comprises: accessing a mapping table, the mapping table including a first portion that maintains mapping between logical and physical addresses, and a second portion that maintains a reference count of cache lines associated with the physical addresses.

In Example 53, the subject matter of Examples 51-52 includes, wherein obtaining the indication of memory reduction of the memory region comprises: accessing a header of a cache line of the cache lines, the header used to maintain a reference count associated with the cache line.

In Example 54, the subject matter of Examples 51-53 includes, wherein obtaining the indication of memory reduction of the memory region comprises: accessing a separate region of the memory containing information of the reference counts associated with each cache line.

In Example 55, the subject matter of Examples 51-54 includes, wherein calculating metrics based on the indication of memory reduction of the cache lines associated with the memory region comprises: calculating a number of cache lines with a reference count value of one.

In Example 56, the subject matter of Examples 51-55 includes, wherein calculating metrics based on the indication of memory reduction of the cache lines associated with the memory region comprises: calculating a number of cache lines with a reference count fewer than a reference count threshold.

In Example 57, the subject matter of Examples 51-56 includes, wherein calculating metrics based on the indication of memory reduction of the cache lines associated with the memory region comprises: calculating a maximum reference count found across the cache lines.

In Example 58, the subject matter of Examples 51-57 includes, wherein calculating metrics based on the indication of memory reduction of the cache lines associated with the memory region comprises: calculating a sum of reference counts for the cache lines.

In Example 59, the subject matter of Examples 51-58 includes, wherein calculating metrics based on the indication of memory reduction of the cache lines associated with the memory region comprises: calculating an average reference count for the cache lines.

In Example 60, the subject matter of Examples 48-59 includes, wherein the memory reduction technique includes memory data compression.

In Example 61, the subject matter of Example 60 includes, wherein the indication of memory reduction is a compression amount, the compression amount representing an amount of data compression of the cache lines associated with the memory region.

In Example 62, the subject matter of Examples 48-61 includes, wherein the memory region is a page, and wherein the memory management mechanisms comprise paging mechanisms.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Processing circuitry for computer memory management, the processing circuitry comprising:
   memory reduction circuitry to implement a memory reduction technique; and
   reference count information collection circuitry to:
      access a memory region of a memory device, wherein the memory region of the memory device is subject to the memory reduction technique, the memory device being a processor cache unit;
      receive an indication of memory reduction of the memory region responsive to a determination that an available memory transgresses a first memory reduction threshold;
      responsive to the indication of memory reduction, calculate reference count metrics of cache lines in the processor cache unit associated with the memory region, the reference count metrics describing a degree of sharing for each of the cache lines; and
      arrange an indication of the memory region within an ordered memory list based on the reference count metrics, the ordered memory list arranged based on memory usage for a plurality of memory regions;
   wherein the memory reduction technique includes initiating a memory deduplication in response to a determination that the available memory transgresses a second memory reduction threshold, the second memory reduction threshold higher than the first memory reduction threshold;
   wherein the reference count metrics enumerate a number of logical addresses that point to a physical address of a cache line of the cache lines associated with the memory region,
   wherein, to calculate reference count metrics based on the indication of memory reduction of the cache lines associated with the memory region, the reference count information collection circuitry is to calculate a number of unique cache lines, each of the number of unique cache lines having an associated reference count value of one, and
   wherein the memory reduction circuitry further implements swapping, based on the number of unique cache lines, a subset of the plurality of memory regions within the ordered memory list to a secondary memory storage to increase available memory.

2. The processing circuitry of claim 1, wherein:
   the memory region is a memory page; and
   the reference count information collection circuitry is to calculate the number of unique cache lines within the memory page.

3. The processing circuitry of claim 1, wherein to obtain the indication of memory reduction of cache lines, the reference count information collection circuitry is to:
   access a mapping table, the mapping table including a first portion that maintains mapping between a plurality of logical addresses and a plurality of physical addresses, and a second portion that maintains a reference count of cache lines associated with the plurality of physical addresses.

4. The processing circuitry of claim 1, wherein to obtain the indication of memory reduction of the memory region, the reference count information collection circuitry is to:
   access a header of a cache line of the cache lines, the header used to maintain a reference count associated with the cache line.

5. The processing circuitry of claim 4, wherein to obtain the indication of memory reduction of the memory region, the reference count information collection circuitry is to:
   access a second region of the memory device containing information of the reference count associated with the cache line.

6. The processing circuitry of claim 1, wherein to calculate reference count metrics based on the indication of memory reduction of the cache lines associated with the memory region, the reference count information collection circuitry is to:
   calculate a number of reference cache lines with a reference count fewer than a reference count threshold.

7. The processing circuitry of claim 1, wherein to calculate reference count metrics based on the indication of memory reduction of the cache lines associated with the memory region, the reference count information collection circuitry is to:
   calculate a maximum reference count found across the cache lines.

8. The processing circuitry of claim 1, wherein to calculate reference count metrics based on the indication of memory reduction of the cache lines associated with the memory region, the reference count information collection circuitry is to:
   calculate a sum of reference counts for the cache lines.

9. The processing circuitry of claim 1, wherein to calculate reference count metrics based on the indication of memory reduction of the cache lines associated with the memory region, the reference count information collection circuitry is to:
   calculate an average reference count for the cache lines.

10. The processing circuitry of claim 1, wherein the memory reduction technique includes memory data compression.

11. The processing circuitry of claim 10, wherein the indication of memory reduction is a compression amount, the compression amount representing an amount of data compression of the cache lines associated with the memory region.

12. The processing circuitry of claim 2, wherein the memory deduplication is further based on paging mechanisms.

13. A method of computer memory management, the method comprising:
    accessing, through processing circuitry, a memory region of a memory device, wherein the memory region of the memory device is subject to a memory reduction technique, the memory device being a processor cache unit;
    receiving an indication of memory reduction of the memory region responsive to a determination that an available memory transgresses a first memory reduction threshold;
    responsive to the indication of memory reduction, calculating reference count metrics of cache lines in the processor cache unit associated with the memory region, the reference count metrics describing a degree of sharing for each of the cache lines; and
    arranging an indication of the memory region within an ordered memory list based on the reference count metrics, the ordered memory list arranged based on memory usage for a plurality of memory regions;
    wherein the memory reduction technique includes initiating a memory deduplication in response to a determination that the available memory transgresses a second memory reduction threshold, the second memory reduction threshold higher than the first memory reduction threshold;
    wherein the reference count metrics enumerate a number of logical addresses that point to a physical address of a cache line of the cache lines associated with the memory region,
    wherein calculating reference count metrics of the cache lines associated with the memory region includes calculating a number of unique cache lines, each of the number of unique cache lines having an associated reference count value of one, and
    the method further including swapping, based on the number of unique cache lines, a subset of the plurality of memory regions within the ordered memory list to a secondary memory storage to increase available memory.

14. The method of claim 13, wherein:
    the memory region is a memory page; and
    calculating reference count metrics includes calculating the number of unique cache lines within the memory page.

15. The method of claim 13, wherein obtaining the indication of memory reduction of the memory region comprises:
    accessing a mapping table, the mapping table including a first portion that maintains mapping between a plurality of logical addresses and a plurality of physical addresses, and a second portion that maintains a reference count of cache lines associated with the plurality of physical addresses.

16. At least one non-transitory machine-readable medium including instructions for computer memory management, the instructions when executed by a processing circuitry, cause the processing circuitry to perform operations comprising:
    accessing a memory region of a memory device, wherein the memory region of the memory device is subject to a memory reduction technique, the memory device being a processor cache unit;
    receiving an indication of memory reduction of the memory region responsive to a determination that an available memory transgresses a first memory reduction threshold;
    responsive to the indication of memory reduction, calculating reference count metrics of cache lines in the processor cache unit associated with the memory region, the reference count metrics describing a degree of sharing for each of the cache lines; and
    arranging an indication of the memory region within an ordered memory list based on the reference count metrics, the ordered memory list arranged based on memory usage for a plurality of memory regions;
    wherein the memory reduction technique includes initiating a memory deduplication in response to a determination that the available memory transgresses a second memory reduction threshold, the second memory reduction threshold higher than the first memory reduction threshold;
    wherein the reference count metrics enumerate a number of logical addresses that point to a physical address of a cache line of the cache lines associated with the memory region,
    wherein calculating reference count metrics of the cache lines associated with the memory region includes calculating a number of unique cache lines, each of the number of unique cache lines having an associated reference count value of one, and
    wherein the memory reduction technique further implements swapping, based on the number of unique cache lines, a subset of the plurality of memory regions within the ordered memory list to a secondary memory storage to increase available memory.

17. The at least one non-transitory machine-readable medium of claim 16, wherein the memory reduction technique includes memory data compression.

18. The at least one non-transitory machine-readable medium of claim 17, wherein the indication of memory reduction is a compression amount, the compression amount representing an amount of data compression of the cache lines associated with the memory region.

19. The at least one non-transitory machine-readable medium of claim 16, wherein:
    the memory region is a memory page;
    calculating reference count metrics includes calculating the number of unique cache lines within the memory page; and
    the memory deduplication is further based on paging mechanisms.

20. The processing circuitry of claim 1, wherein the ordered memory list is further arranged based on an access history associated with the memory region.

21. The method of claim 13, wherein the ordered memory list is further arranged based on an access history associated with the memory region.

22. The at least one non-transitory machine-readable medium of claim 16, wherein the ordered memory list is further arranged based on an access history associated with the memory region.

* * * * *